(12) United States Patent
Singh et al.

(10) Patent No.: US 10,230,621 B2
(45) Date of Patent: Mar. 12, 2019

(54) VARYING A PER-HOP-BANDWIDTH CONSTRAINT IN MULTI-PATH LABEL SWITCHED PATHS

(71) Applicant: Juniper Networks, Inc., Sunnyvale, CA (US)

(72) Inventors: Ravi Singh, San Jose, CA (US); Kireeti Kompella, Los Altos, CA (US); Abhishek Deshmukh, Wilmington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 109 days.

(21) Appl. No.: 15/590,711

(22) Filed: May 9, 2017

(65) Prior Publication Data

US 2018/0331941 A1   Nov. 15, 2018

(51) Int. Cl.
*H04J 1/16* (2006.01)
*H04L 12/733* (2013.01)
(Continued)

(52) U.S. Cl.
CPC ............. *H04L 45/20* (2013.01); *H04L 45/10* (2013.01); *H04L 45/16* (2013.01); *H04L 45/24* (2013.01);
(Continued)

(58) Field of Classification Search
CPC ......... H04L 12/18; H04L 45/00; H04L 45/16; H04L 45/22; H04L 45/28; H04L 45/50;
(Continued)

(56) References Cited

U.S. PATENT DOCUMENTS

| 4,199,663 A | 4/1980 | Herzog |
| 6,091,725 A | 7/2000 | Cheriton et al. |

(Continued)

FOREIGN PATENT DOCUMENTS

EP      2224649 A1    9/2010

OTHER PUBLICATIONS

Extended Search Report from counterpart European Application No. 18165174.6, dated Aug. 13, 2018, 12 pp.

(Continued)

*Primary Examiner* — Jung Liu
(74) *Attorney, Agent, or Firm* — Shumaker & Sieffert, P.A.

(57) ABSTRACT

Techniques are described for varying a bandwidth constraint at one or more hops along a path of a sub-label-switched path (sub-LSP) of a multi-path label-switched path (MP-LSP). The techniques include computing, by an ingress router, a plurality of paths for a plurality of sub-LSPs of a MP-LSP and outputting, by the ingress router, for each path of the plurality of paths, a respective resource reservation request message to establish a respective sub-LSP of the plurality of sub-LSPs, each respective resource reservation request message including an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint.

30 Claims, 8 Drawing Sheets

(51) Int. Cl.
*H04L 12/707* (2013.01)
*H04L 12/911* (2013.01)
*H04L 12/803* (2013.01)
*H04L 12/751* (2013.01)
*H04L 12/761* (2013.01)
*H04L 12/775* (2013.01)
*H04L 12/721* (2013.01)

(52) U.S. Cl.
CPC .............. *H04L 45/58* (2013.01); *H04L 45/66* (2013.01); *H04L 47/125* (2013.01); *H04L 47/726* (2013.01); *H04L 47/748* (2013.01); *H04L 47/825* (2013.01)

(58) Field of Classification Search
CPC ..... H04L 41/0668; H04L 45/02; H04L 45/48; H04L 45/502; H04L 47/728; H04L 47/70
See application file for complete search history.

(56) References Cited

U.S. PATENT DOCUMENTS

| | | | |
|---|---|---|---|
| 6,118,760 | A | 9/2000 | Zaumen et al. |
| 6,243,667 | B1 | 6/2001 | Kerr et al. |
| 6,651,099 | B1 | 11/2003 | Dietz et al. |
| 6,653,005 | B1 | 11/2003 | Muradov |
| 6,909,713 | B2 | 6/2005 | Magnussen et al. |
| 6,980,550 | B1 | 12/2005 | Yip et al. |
| 7,206,861 | B1 | 4/2007 | Callon |
| 7,277,386 | B1 | 10/2007 | Ferguson et al. |
| 7,319,700 | B1 | 1/2008 | Kompella |
| 7,633,871 | B1 | 12/2009 | Callon |
| 7,808,898 | B2 | 10/2010 | Eswaran et al. |
| 8,004,990 | B1 | 8/2011 | Callon |
| 8,107,363 | B1 | 1/2012 | Saluja |
| 8,218,553 | B2 | 7/2012 | Kompella |
| 8,259,585 | B1 | 9/2012 | Arun et al. |
| 2001/0043585 | A1 | 11/2001 | Hummel |
| 2003/0137971 | A1 | 7/2003 | Gibson et al. |
| 2003/0137978 | A1 | 7/2003 | Kanetake |
| 2003/0231628 | A1 | 12/2003 | Harada et al. |
| 2004/0013113 | A1 | 1/2004 | Singh et al. |
| 2004/0258073 | A1 | 12/2004 | Alexander et al. |
| 2005/0160171 | A1 | 7/2005 | Rabie et al. |
| 2005/0169266 | A1 | 8/2005 | Aggarwal et al. |
| 2006/0013232 | A1 | 1/2006 | Xu et al. |
| 2006/0098587 | A1 | 5/2006 | Vasseur et al. |
| 2006/0159009 | A1* | 7/2006 | Kim ........................ H04L 12/18 370/216 |
| 2006/0182035 | A1 | 8/2006 | Vasseur |
| 2007/0109015 | A1 | 5/2007 | Hanes et al. |
| 2007/0133406 | A1 | 6/2007 | Vasseur |
| 2007/0133433 | A1 | 6/2007 | Nam et al. |
| 2007/0174483 | A1* | 7/2007 | Raj ........................ H04L 12/18 709/238 |
| 2007/0248084 | A1 | 10/2007 | Whitehead |
| 2008/0084890 | A1 | 4/2008 | Kompella |
| 2008/0126565 | A1 | 5/2008 | Osano |
| 2008/0219258 | A1 | 9/2008 | Bowen et al. |
| 2009/0185478 | A1* | 7/2009 | Zhang .................... H04L 45/00 370/216 |
| 2010/0024008 | A1 | 1/2010 | Hopen et al. |
| 2010/0208733 | A1 | 8/2010 | Zhao et al. |
| 2010/0214913 | A1 | 8/2010 | Kompella |
| 2012/0207012 | A1 | 8/2012 | Kompella |

OTHER PUBLICATIONS

Notice of Allowance from U.S. Appl. No. 12/507,200, dated Mar. 21, 2012, 14 pp.
Prosecution History from U.S. Appl. No. 13/456,046, dated Nov. 5, 2012 through Aug. 28, 2013, 80 pp.
Viswanathan et al., "Evolution of Multiprotocol Label Switching," IEEE Communications Magazine, May 1998, pp. 165-173.
Aggarwal et al., "Extensions to RSVP-TE for Point to Multipoint TE LSPs," Network Working Group, Internet-Draft, May 2005, 45 pp.
Deshmukh et al., "RSVP Extensions for RMR draft-deshmukh-rsvp-rmr-extension-01," TEAS WG, Internet-Draft, Oct. 31, 2016, 15 pp.
Wroclawski, "The Use of RSVP with IETF Integrated Services," RFC 2210, Network Working Group, Sep. 1997, 33 pp.
Andersson et al., "LDP Specification," RFC 3036, Network Working Group, Jan. 2001, 132 pp.
Awduche et al., "RSVP-TE: Extensions to RSVP for LSP Tunnels," RFC 3209, Network Working Group, Dec. 2001, 61 pp.
"Maximize Bandwidth Utilization with Juniper Networks TE++—Lower Operations Overhead while Simplifying Network Planning," White Paper, Juniper Networks, Inc., Oct. 2015, 10 pp.
Kompella et al., "Multi-path Label Switched Paths Signaled Using RSVP-TE draft-kompella-mpls-rsvp-ecmp-06.txt," Network Working Group, Internet-Draft, Mar. 9, 2015, 19 pp.

\* cited by examiner

VARYING A PER-HOP-BANDWIDTH CONSTRAINT IN MULTI-PATH LABEL SWITCHED PATHS

TECHNICAL FIELD

The disclosure relates to computer networks and, more particularly, to engineering traffic flows within computer networks.

BACKGROUND

The term "link" is often used to refer to the connection between two devices on a computer network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Procedures for LDP by which label switching routers (LSRs) distribute labels to support MPLS forwarding along normally routed paths are described in RFC 3036, "LDP Specification," Internet Engineering Task Force (IETF), hereby incorporated by reference. Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System—Intermediate System (ISIS) protocol or the Open Shortest Path First (OSPF) protocol. RSVP-TE establishes LSPs from an ingress device to an egress device. The use of RSVP (Resource Reservation Protocol), including extensions to establish LSPs in MPLS are described in RFC 3209, "RSVP-TE: Extensions to RSVP for LSP Tunnels," IETF, December 2001, hereby incorporated by reference, and referred to herein as "RFC 3209." The use of RSVP objects to define LSPs is described in RFC 2210, "The Use of RSVP with IETF Integrated Services, IETF, September 1997, hereby incorporated by reference, and referred to herein as "RFC 2210."

SUMMARY

In general, the disclosure is directed toward techniques for establishing a multi-path label switched path (referred to as "multiple path LSP," or simply "MP-LSP") that permits a sub-label-switched paths (sub-LSPs) of the MP-LSP to define a bandwidth constraint that can vary at any hop along a path of the MP-LSP. For example, an ingress router may permit two or more sub-LSPs of a MP-LSP to have varying incoming and outgoing bandwidths at a common transit router when a decrease in bandwidth at one of the sub-LSPs is satisfied by an increase at another sub-LSP.

In one example aspect, a method comprises computing, by an ingress router, a plurality of paths for a plurality of sub-LSPs of a MP-LSP. Computing the plurality of paths comprises determining, for a common transit router, a plurality of incoming per-hop bandwidth constraints for the plurality of paths and a plurality of outgoing per-hop bandwidth constraints for the plurality of paths. A sum of a quantity of bandwidth to be reserved by the plurality of incoming per-hop bandwidth constraints corresponds to a sum of a quantity of bandwidth to be reserved by the plurality of outgoing per-hop bandwidth constraints. For each path of the plurality of paths, a respective incoming per-hop bandwidth constraint of the plurality of incoming per-hop bandwidth constraints has a different value than a respective outgoing per-hop bandwidth constraint of the plurality of outgoing per-hop bandwidth constraints. The method further includes outputting, by the ingress router, for each path of the plurality of paths, a respective resource reservation request message to establish a respective sub-LSP of the plurality of sub-LSPs. Each respective resource reservation request message includes an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint. The one or more instructions includes an instruction to modify the indication of the per-hop bandwidth constraint at the common transit router to correspond to a respective outgoing per-hop bandwidth constraint of the plurality of outgoing per-hop bandwidth constraints.

In another example aspect, a router comprises one or more processors implemented in circuitry. The one or more processors are configured to compute a plurality of paths for a plurality of sub-LSPs of a MP-LSP. Computing the plurality of paths comprises determining, for a common transit router, a plurality of incoming per-hop bandwidth constraints for the plurality of paths and a plurality of outgoing per-hop bandwidth constraints for the plurality of paths. A sum of a quantity of bandwidth to be reserved by the plurality of incoming per-hop bandwidth constraints corresponds to a sum of a quantity of bandwidth to be reserved by the plurality of outgoing per-hop bandwidth constraints. For each path of the plurality of paths, a respective incoming per-hop bandwidth constraint of the plurality of incoming per-hop bandwidth constraints has a different value than a respective outgoing per-hop bandwidth constraint of the plurality of outgoing per-hop bandwidth constraints. The one or more processors are further configured to output, for each path of the plurality of paths, a respective resource reservation request message to establish a respective sub-LSP of the plurality of sub-LSPs. Each respective resource reservation request message includes an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint. The one or more instructions includes an instruction to modify the indication of the per-hop bandwidth constraint at the common transit router to correspond to a respective outgoing per-hop bandwidth constraint of the plurality of outgoing per-hop bandwidth constraints.

In another example aspect, a computer-readable storage medium comprises instructions for causing a programmable processor to compute a plurality of paths for a plurality of sub-LSPs of a MP-LSP. Computing the plurality of paths comprises determining, for a common transit router, a plurality of incoming per-hop bandwidth constraints for the plurality of paths and a plurality of outgoing per-hop bandwidth constraints for the plurality of paths. A sum of a quantity of bandwidth to be reserved by the plurality of incoming per-hop bandwidth constraints corresponds to a sum of a quantity of bandwidth to be reserved by the plurality of outgoing per-hop bandwidth constraints. For each path of the plurality of paths, a respective incoming per-hop bandwidth constraint of the plurality of incoming per-hop bandwidth constraints has a different value than a respective outgoing per-hop bandwidth constraint of the plurality of outgoing per-hop bandwidth constraints. The instructions further cause the programmable processor to output, for each path of the plurality of paths, a respective resource reservation request message to establish a respective sub-LSP of the plurality of sub-LSPs. Each respective resource reservation request message includes an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint. The one or more instructions includes an instruction to modify the indication of the per-hop bandwidth constraint at the common transit router to correspond to a respective outgoing per-hop bandwidth constraint of the plurality of outgoing per-hop bandwidth constraints.

In another example aspect, a method comprises receiving, by a transit router, for a path for a sub-LSP of a MP-LSP, a resource reservation request message to establish the sub-LSP. The resource reservation request message including an indication of an explicit route, a tunnel identifier indicating the MP-LSP, an indication of a per-hop bandwidth constraint that corresponds to a first per-hop bandwidth constraint, and one or more instructions to modify the indication of the per-hop bandwidth constraint. The one or more instructions including an instruction to modify the indication of the per-hop bandwidth constraint at the transit router to correspond to a second per-hop bandwidth constraint that has a different value than the first per-hop bandwidth constraint. The method further includes modifying, by the transit router, the indication of the per-hop bandwidth constraint to correspond to the second per-hop bandwidth constraint; and outputting, by the transit router, after modifying the indication of the per-hop bandwidth constraint, the resource reservation request message.

In another example aspect, a router comprises one or more processors implemented in circuitry. The one or more processors are configured to receive, for a sub-LSP of a MP-LSP, a resource reservation request message to establish the sub-LSP. The resource reservation request message includes an indication of an explicit route, a tunnel identifier indicating the MP-LSP, an indication of a per-hop bandwidth constraint that corresponds to a first per-hop bandwidth constraint, and one or more instructions to modify the indication of the per-hop bandwidth constraint. The one or more instructions includes an instruction to modify the indication of the per-hop bandwidth constraint at the transit router to correspond to a second per-hop bandwidth constraint that has a different value than the first per-hop bandwidth constraint. The one or more processors are further configured to modify the indication of the per-hop bandwidth constraint to correspond to the second per-hop bandwidth constraint and output, after modifying the indication of the per-hop bandwidth constraint, the resource reservation request message.

In another example aspect, a computer-readable storage medium comprises instructions for causing a programmable processor to receive, for a sub-LSP of a MP-LSP, a resource reservation request message to establish the sub-LSP. The resource reservation request message includes an indication of an explicit route, a tunnel identifier indicating the MP-LSP, an indication of a per-hop bandwidth constraint that corresponds to a first per-hop bandwidth constraint, and one or more instructions to modify the indication of the per-hop bandwidth constraint. The instructions further cause the programmable processor to modify the indication of the per-hop bandwidth constraint at the transit router to correspond to a second per-hop bandwidth constraint that has a different value than the first per-hop bandwidth constraint. The one or more processors are further configured to modify the indication of the per-hop bandwidth constraint to correspond to the second per-hop bandwidth constraint and output, after modifying the indication of the per-hop bandwidth constraint, the resource reservation request message.

The details of one or more examples are set forth in the accompanying drawings and the description below. Other features, objects, and advantages will be apparent from the description and drawings, and from the claims.

DETAILED DESCRIPTION

Figure 1:
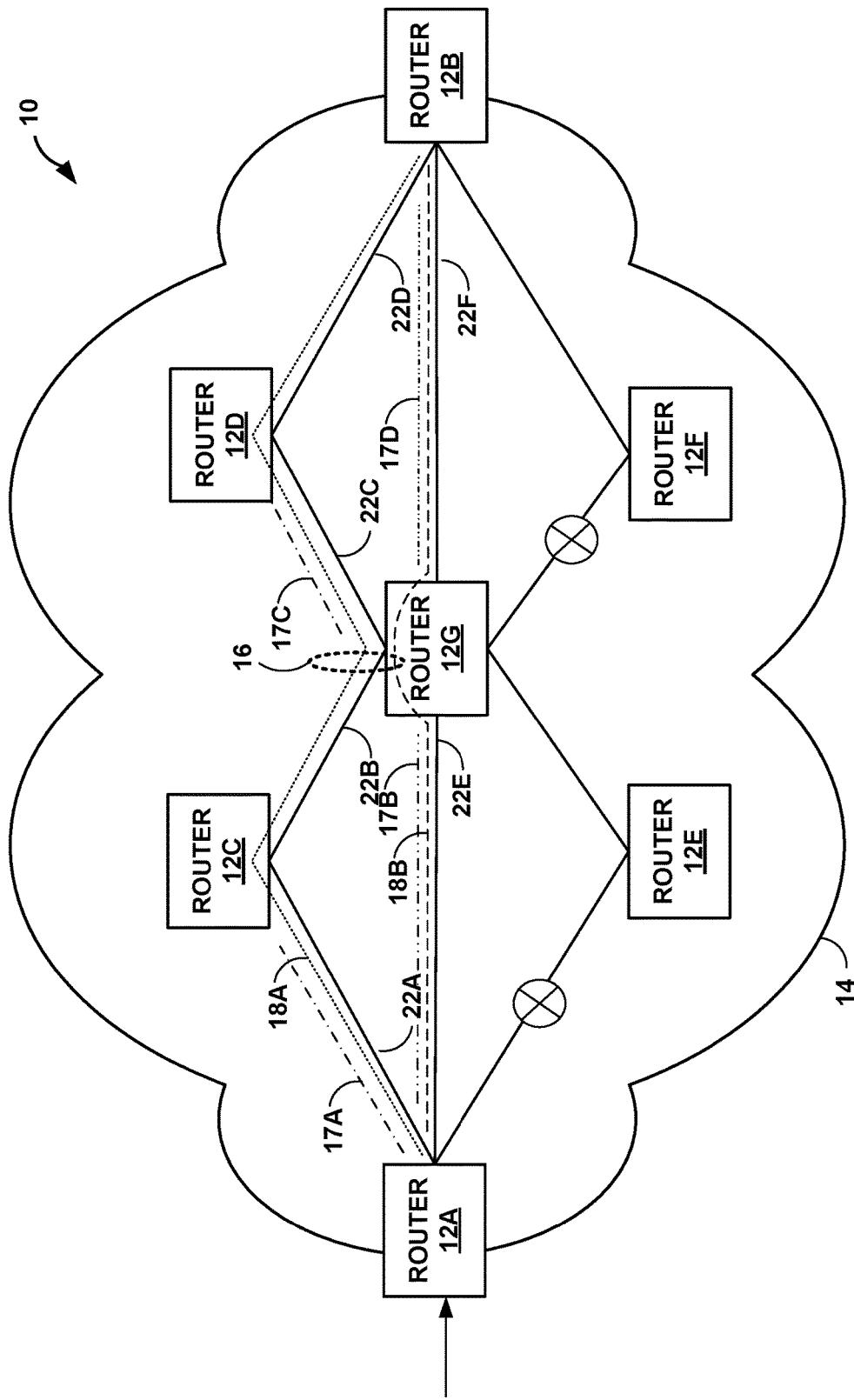
FIG. 1 is a block diagram illustrating an example computer network having a MP-LSP established over the network between an ingress router and an egress router.

In general, a device (e.g., a router) may be configured to use a variety of protocols to establish label switched paths (LSP). For example, a device may establish a LSP having reserved bandwidth using the Resource Reservation Protocol with Traffic Engineering extensions (RSVP-TE). The techniques described herein include extensions to the RSVP-TE protocol that enable a router to send resource reservation request messages for establishing a sub-LSP specifying a bandwidth constraint that may vary per hop along the sub-LSP.

In some systems, an ingress router may permit a bandwidth constraint to vary at a hop along a sub-LSP. For example, the ingress router may establish a first sub-LSP extending between the ingress router and an egress router and a second sub-LSP extending between the ingress router and the egress router. In this example, the first and second sub-LSPs both include a hop at a common transit router. As such, techniques described herein permit the ingress router to vary a bandwidth constraint of the first and second sub-LSPs at a hop corresponding to the common transit router. For instance, the ingress router may establish the first sub-LSP specifying a single per-hop bandwidth constraint with an instruction for the common transit router to increase the single per-hop bandwidth constraint for the first sub-LSP by 30 megabytes per second and establish the second sub-LSP specifying a single per-hop bandwidth constraint with an instruction for the common transit router to decrease the single per-hop bandwidth constraint for the second sub-LSP by 30 megabytes per second.

The techniques described herein include extensions to the RSVP-TE protocol that enable routers to establish a MP-LSP that permits varying bandwidth at sub-LSPs of the MP-LSP. For example, rather than requiring a router to split a single sub-LSP that extends between an ingress router and an egress router into multiple sub-LSPs, the techniques permit a resource reservation request message to include an instruction to modify an indication of the per-hop bandwidth constraint of a sub-LSP at a hop between an ingress router and an egress router for the MP-LSP. This may reduce the need for additional sub-LSPs in the network, thereby potentially reducing an amount of computing resources for sending signaling messages and storing state for the additional sub-LSPs.

The techniques may provide one or more advantages. For example, the techniques may allow devices within the network to make better use of the available bandwidth on various paths across the network. Said differently, being able to vary a per-hop-bandwidth constraint when setting up a sub-LSP may facilitate better network utilization by splitting traffic for a MP-LSP at transit routers and allowing different bandwidth values to be reserved per-hop along the MP-LSP. In addition, the techniques described herein for variable per-hop bandwidth signaling may reduce the amount of state needed to be maintained in the network, because the techniques would potentially establish fewer sub-LSPs between a pair of endpoints as compared to techniques that do not use variable per-hop bandwidth signaling.

FIG. 1 is a block diagram illustrating a system 10 that includes an example computer network 14 having MP-LSP 16 established over links 22A-22F (collectively, links 22) of network 14 between an ingress router 12A and an egress router 12B. For example, MP-LSP 16 may include a RSVP-TE LSP. In the example of FIG. 1, routers 12A-12G (collectively, routers 12) use a modified RSVP-TE protocol that has been extended to enable a varying per-hop bandwidth constraint for sub-LSPs of the MP-LSP, as described herein. An ingress router 12A may be configured to establish MP-LSP 16 having sub-LSPs 18A-18B (collectively, sub-LSPs 18) of the MP-LSP. MP-LSP 16 may be viewed as a point-to-point tunnel between a single ingress and a single egress that is constructed to contain multiple, intermediate sub-LSPs. Packets are sent from router 12A (also referred to as "ingress router 12A") to router 12B (also referred to as "egress router 12B") via one of the sub-LSPs 18.

Network 14 may include a greater number of routers than are shown in FIG. 1. The ultimate sources of the network traffic may comprise one or more devices and/or any public or private network or the Internet (not shown) that provides traffic to ingress router 12A in network 14. The ultimate destinations of the network traffic may comprise one or more destination devices and/or network (not shown) that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

The extensions to RSVP-TE described herein may enable ingress router 12A to calculate paths for multiple sub-LSPs 18 towards egress router(s) 12B, and to send multiple resource reservation request messages for MP-LSP 16 to downstream routers 12 along selected ones of the sub-LSPs 18. Because sub-LSPs 18 may be permitted to have varying bandwidth at different hops between routers 12, routers 12 may be required to store less state in network 14 than if separate smaller LSPs (not shown) having constant bandwidth were constructed for each path extending between egress router 12A and ingress router 12B.

Network 14 may be configured to establish LSPs connecting routers 12 that are not associated with MP-LSP 16. For example, as shown in FIG. 1, other LSPs 17A-17D ("LSPs 17") may have reserved bandwidth between routers 12 of network 14. Specifically, LSP 17A reserves a bandwidth (e.g., 50 megabytes per second) on link 22A that extends between router 12A and 12C, LSP 17B reserves a bandwidth (e.g., 50 megabytes per second) on link 22E that extends between router 12A and 12G, LSP 17C reserves a bandwidth (e.g., 70 megabytes per second) on link 22C that extends between router 12G and 12D, and LSP 17D reserves a bandwidth (e.g., 30 megabytes per second) on link 22F that extends between router 12G and 12B. The extensions to RSVP-TE described herein may enable ingress router 12A to calculate paths for multiple sub-LSPs towards egress router(s) 12B that account for the previously reserved bandwidths of LSPs 17 while signaling the new sub-LSPs with varying per-hop bandwidths.

In some examples, in response to a network administrator or an external Path Computation Engine (PCE) device initiating set-up of MP-LSP 16 from router 12A to router 12B, ingress router 12A uses the extended RSVP-TE protocol to compute some or all of the available sub-LSPs to egress router 12B that satisfy certain constraints on the tunnel imposed by the network administrator. Constraints imposed may include, for example, bandwidth, link color, Shared Risk Link Group (SRLG), and the like. For example, a network administrator may wish to configure MP-LSP 16 for network traffic of 100 megabytes per second. RSVP-TE uses constraint information about links within network 14, such as bandwidth availability, to compute the sub-LSPs. For example, RSVP-TE may use bandwidth availability information accumulated by a link-state interior routing protocol, such as the Intermediate System-Intermediate System (ISIS) protocol or the Open Shortest Path First (OSPF) protocol. The ingress router 12A executing RSVP-TE as extended herein computes multiple sub-LSPs for which certain constraints, including bandwidth, provide the requisite bandwidth availability in sum. This is described in further detail in the examples below. Although described for purposes of example as an ingress router computing the sub-LSPs, in some examples, an external entity such as a PCE may compute the sub-LSPs that ingress router 12A can then establish to establish MP-LSP 16.

As described in further detail, ingress router 12A may signal P2P sub-LSPs (associated components of MP-LSP 16) such that a hop of the sub-LSP may have a different bandwidth requested when compared to other hops. Additionally, ingress router 12A may include an accounting mechanism such that when computing MP-LSP 16, at every hop along a sub-LSP, a sum of a quantity of bandwidth to be reserved by incoming per-hop bandwidth constraints for MP-LSP 16 correspond (e.g., are equal) to a sum of a quantity of bandwidth to be reserved by outgoing per-hop bandwidth constraints.

For example, ingress router 12A may determine total incoming and outgoing per-hop bandwidth constraints for MP-LSP 16. Specifically, in this example, ingress router 12A may decrease a per-hop bandwidth constraint from router 12C to router 12G of 50 megabytes per second to a per-hop bandwidth constraint from router 12G to router 12D of 30 megabytes per second. In this example, ingress router 12A may determine total incoming and outgoing per-hop bandwidth constraints for MP-LSP 16 that include an increase in reserved bandwidth on sub-LSP 18B. Specifically, in this example, ingress router 12A may increase a per-hop bandwidth constraint from ingress router 12A to router 12G of 50 megabytes per second to a per-hop bandwidth constraint from router 12G to egress router 12B of 70 megabytes per second. In this manner, ingress router 12A matches total incoming per-hop bandwidth constraints (e.g., 100 megabytes per second) at a hop at router 12G with total outgoing per-hop bandwidth constraints (e.g., 100 megabytes per second) at the hop at router 12G, while permitting varying bandwidth at sub-LSPs 18 of MP-LSP 16.

Additionally, routers 12 may be configured to use extensions to the RSVP-TE protocol that enable routers 12 to establish MP-LSP 16 when some routers of routers 12 are not specifically configured for the extensions to the RSVP-TE protocol. For example, as described in further detail, routers 12 may advertise the capability described in this document (e.g., per node capability advertisement). In some examples, ingress router 12A may initiate LSP signaling with a varying per-hop bandwidth constraint while requiring capable devices to perform a varying-per-hop bandwidth constraint signaling and while not necessarily requiring incapable devices to perform varying per-hop bandwidth constraint-signaling. For example, in response to receiving advertised capability information indicating that router 12G is configured for extensions to the RSVP-TE protocol that permit router 12G to vary a bandwidth constraint at router 12G and that router 12C is not configured for the extensions, ingress router 12A may establish MP-LSP 16 that instructs router 12G to vary a bandwidth constraint at a hop corresponding to router 12G. In this example, although router 12C is not specifically configured to support varying a bandwidth constraint at router 12C, routers 12 may establish MP-LSP 16 because MP-LSP 16 does not vary a bandwidth constraint at a hop corresponding to router 12C.

Figure 8:
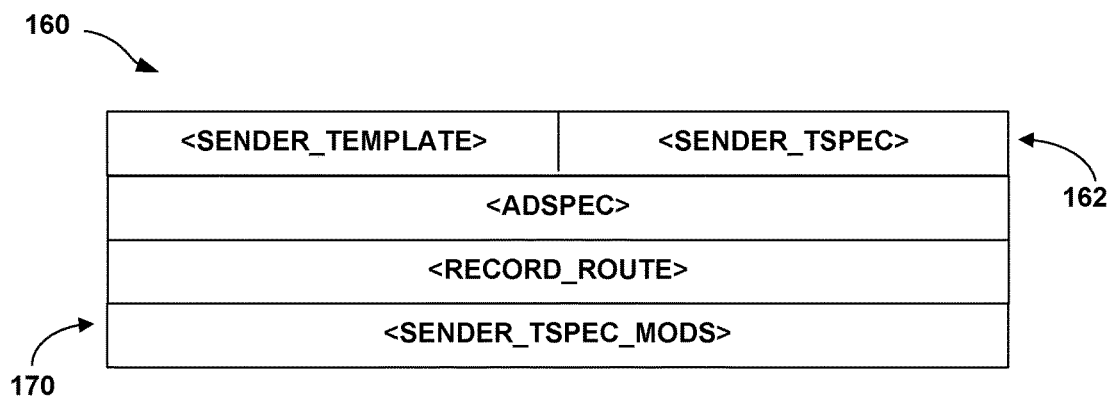
FIG. 8 is a block diagram illustrating an example sender descriptor of the resource reservation request message of FIG. 7 that signals a varying per-hop bandwidth constraint.
Figure 9:
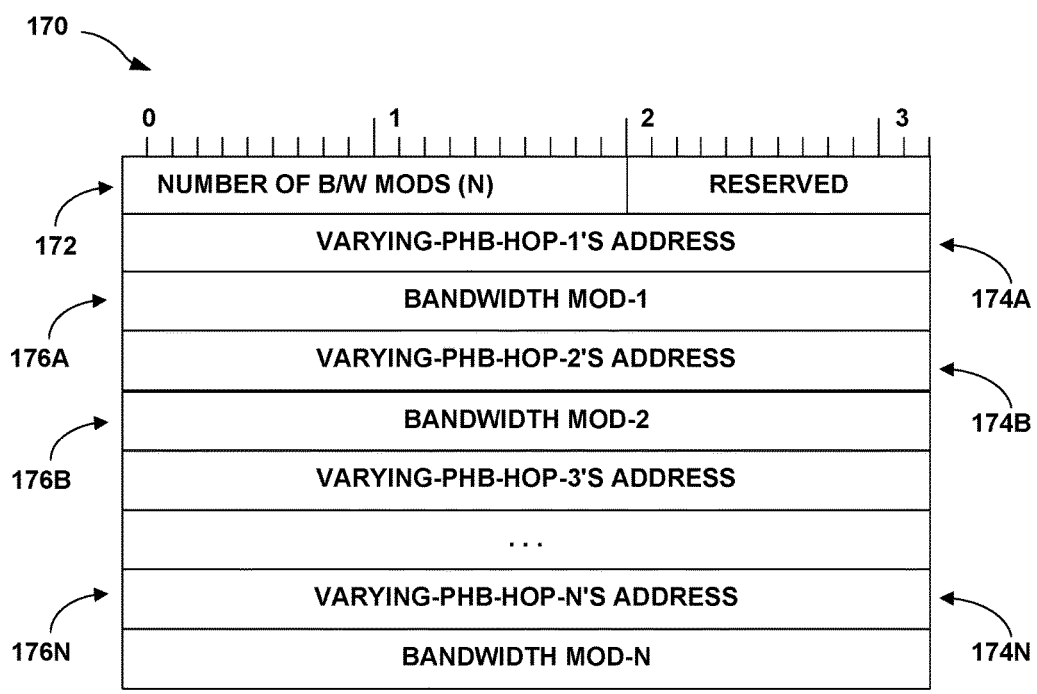
FIG. 9 is a block diagram illustrating an example sender traffic specifier (TSPEC) modification object of the sender descriptor of FIG. 8 that signals a varying per-hop bandwidth constraint.

More specifically, the existing standards may allow ingress router 12A to specify an unvarying per-hop bandwidth constraint in a sender traffic specifier (TSPEC) object, also referred to as "SENDER_TSPEC," of a resource reservation request message. An example of a TSPEC object is illustrated in FIG. 8. In accordance with one or more techniques described herein, ingress router 12A may generate one or more instructions for one or more modifications to the unvarying per-hop bandwidth constraint by encoding the one or more modifications in a sender TSPEC modification object, also referred to as "SENDER_TSPEC_MODS object." An example of a TSPEC modification object is illustrated in FIGS. 8 and 9. In this way, routers 12 that are not specifically configured for extensions to the RSVP-TE protocol that permit a respective router to vary bandwidth constraints at a hop, may be used to establish MP-LSP 16 using a sender TSPEC object while ignoring the sender TSPEC modification object, thereby permitting routers 12 to establish MP-LSP 16 when some routers of routers 12 are not specifically configured for the extensions to the RSVP-TE protocol.

Router 12A may be configured as a single ingress for MP-LSP 16 that supports certain constraint requirements specified in the request, including, for instance, an overall bandwidth constraint of one hundred megabytes per second of network traffic. RSVP-TE executing on router 12A may be configured to compute the sub-LSPs to egress router 12B using constraint information about links within network 14. The constraint information may be collected by router 12A executing a link-state protocol.

Such constraint information may include a per-node-capability-advertisement (e.g., advertised capability information). This advertisement capability may be advertised prior to generating resource reservation request messages to establish MP-LSP 16. For example, router 12A may (initiate and) receive a per-node-capability-advertisement such that that if a sub-LSP of MP-LSP 16 is established by routers 12, per-hop bandwidth constraints may be honored by all routers 12 that are listed in an explicit route object. Otherwise, ingress router 12A may configure a sub-LSP of MP-LSP 16 for which ingress router 12A requests a router that is not configured to modify per-hop bandwidth constraints to modify a certain per-hop bandwidth constraint. In some examples, routers 12 may advertise the per-hop bandwidth constraint capability using IGP-TE extensions. For example, ingress router 12A may advertise the per-hop bandwidth constraint capability by including the capability information in IGP-TE messages exchanged by the routers 12.

Ingress routers requesting a varying per-hop bandwidth constraint from a capable node (e.g., routers 12) is discussed in the following. By virtue of the per-node-capability advertisement, the ingress device (e.g., ingress router 12A) may determine compatibility information indicating which nodes are capable of processing a varying per-hop bandwidth constraint object in a resource reservation request message. As such, the ingress device (e.g., ingress router 12A) may compute a constrained shortest path first (CSPF) for a MP-LSP (e.g., MP-LSP 16) and its sub-LSPs (e.g., sub-LSPs 18) using the compatibility information.

In the example of FIG. 1, in response to the request, router 12A computes paths for sub-LSP 18A along links 22A-22D toward egress router 12B. Ingress router 12A also identifies sub-LSP 18B along links 22E-22F toward egress router 12B. At this time, based on network state data maintained by the RSVP protocol, ingress router 12A may determine the amount of bandwidth available for reservation along both sub-LSPs 18A, 18B, and may output multiple resource reservation request messages so as to establish two sub-LSPs that together satisfy the overall bandwidth requirements. In this example, ingress router 12A may determine that 50 megabytes per second of bandwidth is available for reservation along sub-LSP 18A between ingress router 12A and transit router 12G and that 50 megabytes per second of bandwidth can be reserved. In this example, router 12A may determine that 30 megabytes per second of bandwidth is available for reservation along sub-LSP 18A between transit router 12G and egress router 12B and that 70 megabytes per second of bandwidth can be reserved along sub-LSP 18B between transit router 12G and egress router 12B.

Together, sub-LSPs 18A and 18B can accommodate the required total of 100 megabytes per second of network traffic for MP-LSP 16. That is, for example, a sum of a quantity of bandwidth to be reserved by incoming per-hop bandwidth constraints for transit router 12G may correspond (e.g., is equal) to a sum of a quantity of bandwidth to be reserved by outgoing per-hop bandwidth constraints for transit router 12G, while, for each path of paths for MP-LSP 16, a respective incoming per-hop bandwidth constraint for transit router 12G has a different value than a respective outgoing per-hop bandwidth constraint for transit router 12G. For instance, a path for sub-LSP 18A may include incoming per-hop bandwidth constraint for transit router 12G of 50 megabytes per second that has a different value than an outgoing per-hop bandwidth constraint for transit router 12G of 30 megabytes per second. Similarly, a path for sub-LSP 18B may include incoming per-hop bandwidth constraint for transit router 12G of 50 megabytes per second that has a different value than an outgoing per-hop bandwidth constraint for transit router 12G of 70 megabytes per second. In this instance, a sum of a quantity of bandwidth to be reserved by incoming per-hop bandwidth constraints for transit router 12G of 100 megabytes per second corresponds to a sum of a quantity of bandwidth to be reserved by outgoing per-hop bandwidth constraints for transit router 12G of 100 megabytes per second.

Ingress router 12A may compute other sub-LSPs to egress router 12B, but may select only the best sub-LSPs that are able to accommodate the total bandwidth requested. In some embodiments, ingress router 12A may be configured with an upper limit on the number of sub-LSPs that can be computed and/or selected.

In operation, ingress router 12A may compute paths for sub-LSPs 18 of MP-LSP 16. To compute the paths, ingress router 12A determines, for router 12G, an incoming per-hop bandwidth constraints for the paths and outgoing per-hop bandwidth constraints for the paths. A sum of a quantity of bandwidth to be reserved by the incoming per-hop bandwidth constraints may correspond to a sum of a quantity of bandwidth to be reserved by the outgoing per-hop bandwidth constraints. As used herein, a first sum of a quantity of bandwidth may correspond to a second sum of a quantity of bandwidth when the first sum is equal to the second sum. For each path of the paths, a respective incoming per-hop bandwidth constraint of the incoming per-hop bandwidth constraints has a different value than a respective outgoing per-hop bandwidth constraint of the outgoing per-hop bandwidth constraints.

For example, ingress router 12A may determine an incoming per-hop bandwidth constraint for a portion of the path from router 12C to router 12G of 50 megabytes per second and an outgoing per-hop bandwidth constraint for a portion of the path from router 12G to router 12D of 30 megabytes per second. In this example, ingress router 12A may determine an incoming per-hop bandwidth constraint for a portion of the path from router 12A to router 12G of 50 megabytes per second and an outgoing per-hop bandwidth constraint for a portion of the path from router 12G to router 12B of 70 megabytes per second.

Figure 2:
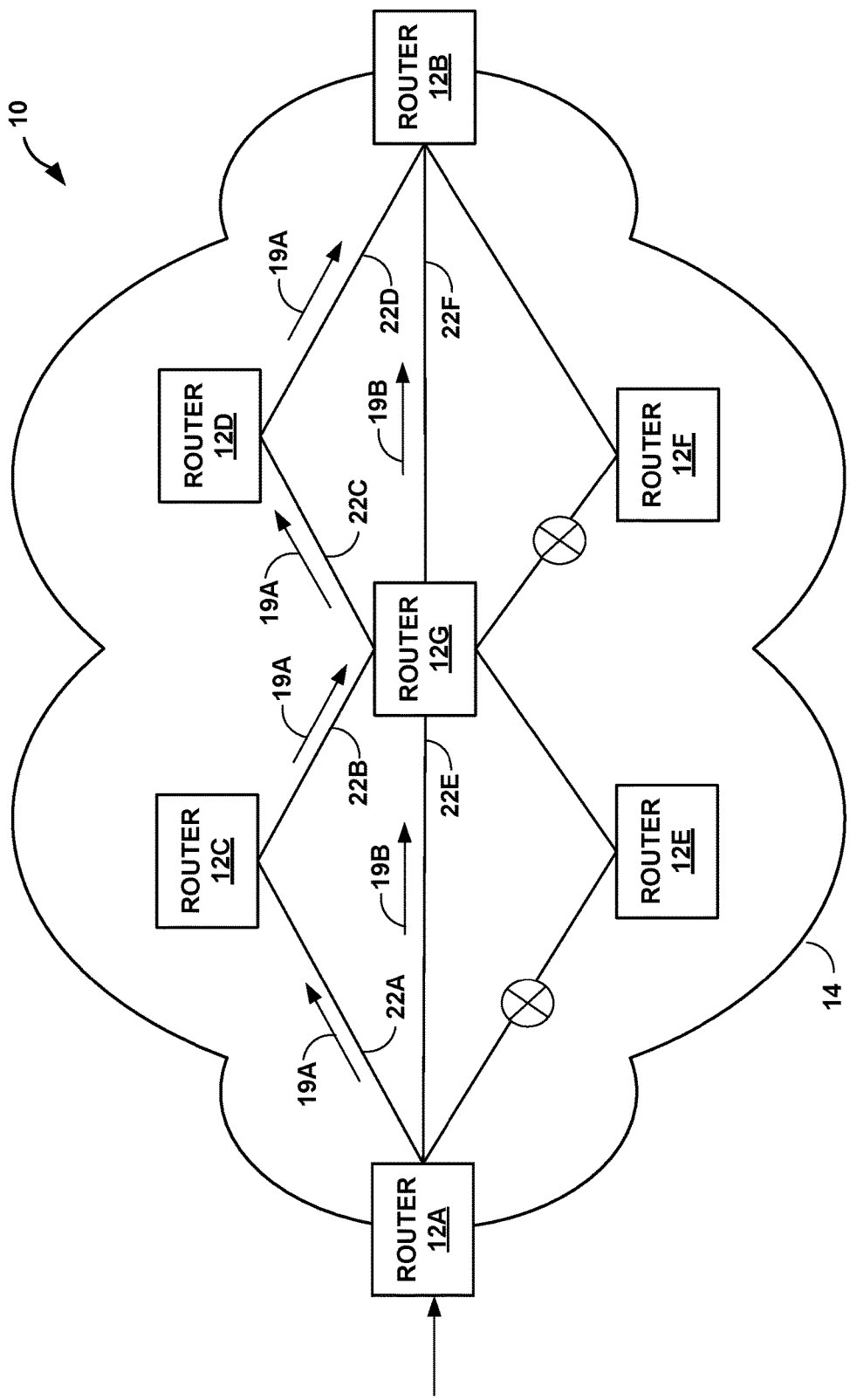
FIG. 2 is a block diagram illustrating example resource reservation request messages sent by routers within the computer network for establishing a MP-LSP having a varying per-hop bandwidth constraint.

FIG. 2 is a block diagram illustrating example resource reservation request messages 19A and 19B (collectively, resource reservation request messages 19) sent by routers 12 within computer network 14 for establishing a MP-LSP having a varying per-hop bandwidth constraint. As shown in FIG. 2, in response to computing sub-LSPs 18 of MP-LPS 16 (FIG. 1), ingress router 12A outputs corresponding resource reservation request messages 19 to establish sub-LSPs 18. As shown, routers 12 coordinate to send resource reservation request messages 19 to establish sub-LSPs 18 configured for reserving bandwidth from ingress router 12A to egress router 12B. Further, ingress router 12A may be configured as the single ingress for an MP-LSP tunnel that, on the whole, supports certain constraint requirements specified in the request, including an overall bandwidth constraint of network traffic. Ingress router 12A may be configured to compute, using RSVP-TE, sub-LSPs 18 to egress router 12B using constraint information about links 22 within network 14.

In response to a single request to establish a MP-LSP from router 12A to router 12B (e.g., a request from an administrator or from another network device, such as a device upstream from router 12A), routers 12 may coordinate to send multiple resource reservation request messages 19 to establish sub-LSPs 18 of FIG. 1 from ingress router 12A to egress router 12B, where each of the sub-LSPs is part of MP-LSP 16 of FIG. 1. For example, the extended RSVP-TE protocol of router 12A outputs resource reservation request message 19A for establishing sub-LSP 18A (FIG. 1). In this example, resource reservation request message 19A may include an EXPLICIT_ROUTE object that defines each downstream hop along sub-LSP 18A. For instance, the EXPLICIT_ROUTE object included in resource reservation request message 19A may define a sequence of downstream hops for sub-LSP 18A that includes router 12A, router 12C, router 12Q router 12D, and router 12B. As such, upon receipt of resource reservation request message 19A, router 12C determines that a next downstream hop indicated by the EXPLICIT_ROUTE object included in resource reservation request message 19A is router 12G and may forward resource reservation request message 19A to router 12G Similarly, resource reservation request message 19B may include an EXPLICIT_ROUTE object that defines each downstream hop along sub-LSP 18B. For instance, the EXPLICIT_ROUTE object included in resource reservation request message 19B may define a sequence of downstream hops for sub-LSP 18B that includes router 12A, router 12Q and router 12B. As such, upon receipt of resource reservation request message 19A, router 12G may determine that a next downstream hop indicated by the EXPLICIT_ROUTE object included in resource reservation request message 19B is router 12B and may forward resource reservation request message 19B to router 12B.

Upon receiving resource reservation request messages 19, each of routers 12 may allocate, for each of resource reservation request messages 19, one or more resources of the transit router to satisfy a per-hop bandwidth constraint of the instruction to modify the indication of the per-hop bandwidth constraint. For example, router 12G may extract a per-hop bandwidth constraint from an indication of the per-hop bandwidth constraint of resource reservation request message 19A and may reserve an amount of bandwidth that satisfies (e.g., is equal to) the per-hop bandwidth constraint extracted from the indication of the per-hop bandwidth constraint. For instance, router 12G may reserve 50 megabytes per second for sub-LSP 18A when a SENDER_TSPEC object of resource reservation request message 19A includes a token-bucket "rate" field and a "burst" field indicating 50 megabytes per second. Similarly, router 12G may reserve the amount of bandwidth requested in the received resource reservation request message 19B. For instance, router 12G may reserve 50 megabytes per second for sub-LSP 18B when a SENDER_TSPEC object of resource reservation request message 19B includes a token-bucket "rate" field and a "burst" field indicating 50 megabytes per second.

In operation, ingress router 12A outputs resource reservation request message 19A to router 12C and resource reservation request message 19B to router 12G in accordance with the computed paths (e.g., sub-LSPs 18) for MP-LSP 16 of FIG. 1. In this example, resource reservation request messages 19 each include an indication of a per-hop bandwidth constraint that corresponds to 50 megabytes per second. For instance, ingress router 12A generates and sends, for sub-LSP 18A, resource reservation request message 19A that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second. Similarly, for instance, ingress router 12A generates and sends, for sub-LSP 18B, resource reservation request message 19B that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second.

However, in accordance with the techniques of this disclosure, resource reservation request message 19A may in this example include an instruction to modify the indication of the per-hop bandwidth constraint from 50 megabytes per second to 30 megabytes per second at router 12G and resource reservation request message 19B includes an instruction to modify the indication of the per-hop bandwidth constraint from 50 megabytes per second to 70 megabytes per second at router 12G For instance, ingress router 12A generates and sends, for sub-LSP 18A, resource reservation request message 19A that further includes a SENDER_TSPEC MODS object that includes an address (e.g., IPV4, IPV6, etc.) of router 12G and a corresponding bandwidth mod value that includes a token-bucket "rate" field and a "burst" field indicating 30 megabytes per second. In this instance, ingress router 12A generates and sends, for sub-LSP 18B, resource reservation request message 19B that further includes a SENDER_TSPEC_MODS object that includes an address (e.g., IPV4, IPV6, etc.) of router 12G and a corresponding bandwidth mod value that includes a token-bucket "rate" field and a "burst" field indicating 70 megabytes per second.

Upon receiving resource reservation request message 19A, router 12C may reserve the amount of bandwidth requested in the received resource reservation request message 19A. For example, router 12C may reserve 50 megabytes per second for sub-LSP 18A when a SENDER_TSPEC object of resource reservation request message 19A includes a token-bucket "rate" field and a "burst" field indicating 50 megabytes per second.

Router 12C may determine whether to modify the indication of the per-hop bandwidth constraint of resource reservation request message 19A. For example, router 12C may determine to not modify the indication of the per-hop bandwidth constraint of resource reservation request message 19A when a SENDER_TSPEC_MODS object of resource reservation request message 19A does not include an address corresponding to router 12C. In instances where router 12C is not configured for extensions for modifying an indication of the per-hop bandwidth constraint, router 12C may ignore the bandwidth modifications field and may reserve the amount of bandwidth requested in the received resource reservation request message 19A. For instance, router 12C may ignore a SENDER_TSPEC_MODS object of resource reservation request message 19A. In any case, router 12C may forward resource reservation request message 19A to router 12G. For example, in response to determining that the EXPLICIT_ROUTE object included in resource reservation request message 19A indicates a next downstream hop is to router 12Q router 12C may forward resource reservation request message 19A to router 12G.

Upon receiving resource reservation request message 19A, router 12G may reserve the amount of bandwidth requested in the received resource reservation request message 19A. For example, router 12G may reserve 50 megabytes per second for sub-LSP 18A when a SENDER_TSPEC object of resource reservation request message 19A includes a token-bucket "rate" field and a "burst" field indicating 50 megabytes per second.

Router 12G may determine whether to modify the indication of the per-hop bandwidth constraint of resource reservation request message 19A. For example, router 12G may determine to modify the indication of the per-hop bandwidth constraint of resource reservation request message 19A when a SENDER_TSPEC_MODS object of resource reservation request message 19A includes an address corresponding to router 12G. In response to determining to modify the indication of the per-hop bandwidth constraint of resource reservation request message 19A, router 12G may modify resource reservation request message 19A according to the instruction to modify the indication of the per-hop bandwidth constraint. For instance, router 12G may modify the a token-bucket "rate" field and a "burst" field of the SENDER_TSPEC object of resource reservation request message 19A to indicate 30 megabytes per second when the SENDER_TSPEC_MODS object of resource reservation request message 19A indicates a token-bucket "rate" field and a "burst" field of 30 megabytes per second. Router 12G may forward the modified resource reservation request message 19A to router 12D. For example, in response to determining that the EXPLICIT_ROUTE object included in resource reservation request message 19A indicates a next downstream hop is to router 12D, router 12G may forward resource reservation request message 19A to router 12D.

Upon receiving resource reservation request message 19A, router 12D may reserve the amount of bandwidth requested in the received resource reservation request message 19A. For example, router 12D may reserve 30 megabytes per second for sub-LSP 18A when a SENDER_TSPEC object of resource reservation request message 19A includes a token-bucket "rate" field and a "burst" field indicating 30 megabytes per second. Router 12C may determine whether to modify the indication of the per-hop bandwidth constraint of resource reservation request message 19A. For example, router 12D may determine to not modify the indication of the per-hop bandwidth constraint of resource reservation request message 19A when a SENDER_TSPEC_MODS object of resource reservation request message 19A does not include an address corresponding to router 12D. In instances where router 12D is not configured for extensions for modifying a requested amount of bandwidth, router 12D may ignore the bandwidth modifications field and may reserve the amount of bandwidth requested in the received resource reservation request message 19A. For instance, router 12D may ignore a SENDER_TSPEC_MODS object of resource reservation request message 19A. In any case, router 12D may forward resource reservation request message 19A to router 12B. For example, in response to determining that the EXPLICIT_ROUTE object included in resource reservation request message 19A indicates a next downstream hop is to router 12B, router 12D may forward resource reservation request message 19A to router 12B.

Similarly, upon receiving resource reservation request message 19B, router 12G may reserve the amount of bandwidth requested in the received resource reservation request message 19B. For example, router 12G may reserve 50 megabytes per second for sub-LSP 18B when a SENDER_TSPEC object of resource reservation request message 19B includes a token-bucket "rate" field and a "burst" field indicating 50 megabytes per second.

Router 12G may determine whether to modify the indication of the per-hop bandwidth constraint of resource reservation request message 19B. For example, router 12G may determine to modify the indication of the per-hop bandwidth constraint of resource reservation request message 19B when a SENDER_TSPEC_MODS object of resource reservation request message 19B includes an address corresponding to router 12G. In response to determining to modify the indication of the per-hop bandwidth constraint of resource reservation request message 19B, router 12G may modify resource reservation request message 19B according to the instruction to modify the indication of the per-hop bandwidth constraint. For instance, router 12G may modify the a token-bucket "rate" field and a "burst" field of the SENDER_TSPEC object of resource reservation request message 19B to indicate 70 megabytes per second when the SENDER_TSPEC_MODS object of resource reservation request message 19B indicates a token-bucket "rate" field and a "burst" field of 70 megabytes per second. Router 12G may forward resource reservation request message 19B to router 12B. For example, in response to determining that the EXPLICIT_ROUTE object included in resource reservation request message 19A indicates a next downstream hop is to router 12B, router 12G may forward resource reservation request message 19B to router 12B.

Upon receiving resource reservation request messages 19, router 12B may reserve the amount of bandwidth requested in the received resource reservation request messages 19. For example, router 12B may reserve 30 megabytes per second for sub-LSP 18A when a SENDER_TSPEC object of resource reservation request message 19A includes a token-bucket "rate" field and a "burst" field indicating 30 megabytes per second. In this example, router 12B may reserve 70 megabytes per second for sub-LSP 18B when a SENDER_TSPEC object of resource reservation request message 19B includes a token-bucket "rate" field and a "burst" field indicating 70 megabytes per second.

Router 12B may determine that router 12B corresponds to a final downstream hop for sub-LSP 18A. For example, router 12B may determine that router 12B corresponds to a final downstream hop for sub-LSP 18A in response to determining that the EXPLICIT_ROUTE object included in resource reservation request message 19A indicates a final downstream hop is to router 12B. Similarly, router 12B may determine that router 12B corresponds to a final downstream hop for sub-LSP 18B. For example, router 12B may determine that router 12B corresponds to a final downstream hop for sub-LSP 18B in response to determining that the EXPLICIT_ROUTE object included in resource reservation request message 19B indicates a final downstream hop is to router 12B.

Figure 3:
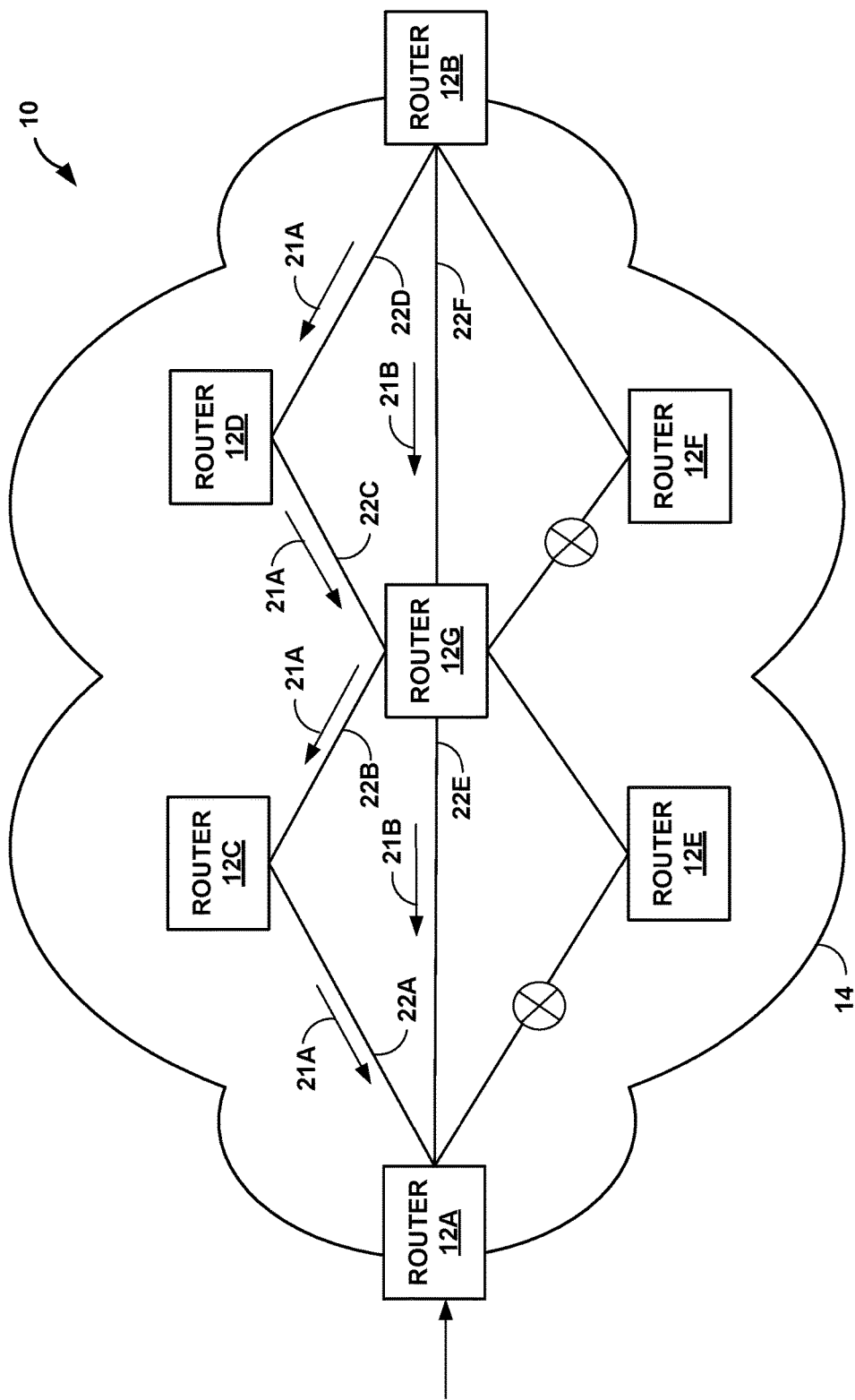
FIG. 3 is a block diagram illustrating example resource reservation reply message sent by routers within the computer network for establishing a MP-LSP having a varying per-hop bandwidth constraint.

Upon determining that router 12B corresponds to a final downstream hop for sub-LSPs 18, router 12B may generate a resource reservation reply message as discussed in FIG. 3. Additionally, for both sub-LSP 18A and sub-LSP 18B, rather than router 12G immediately sending a resource reservation reply messages to router 12C and router 12A indicating that router 12G has reserved the requested amounts of bandwidth, router 12G may be configured to wait to send any resource reservation reply messages until after confirming that router 12G has first received resource reservation reply messages from downstream routers along the sub-LSPs, in accordance with the techniques of this disclosure. That is, router 12G may wait to send resource reservation reply messages until router 12G has received replies to both the resource reservation request message 19A sent to router 12D and the resource reservation request message 19B sent to router 12B.

Although the above examples illustrate a single common transit router, other examples may include two or more common transit routers along MP-LSP 16. For example, to compute paths, router 12A may determine, for a second common transit router (not shown), incoming per-hop bandwidth constraints for the paths and outgoing per-hop bandwidth constraints for the paths. In this example, a sum of a quantity of bandwidth to be reserved by the incoming per-hop bandwidth constraints for the second common transit router may correspond to a sum of a quantity of bandwidth to be reserved by the outgoing per-hop bandwidth constraints for the second common transit router. In this example, for each path of the paths, a respective incoming per-hop bandwidth constraint of the incoming per-hop bandwidth constraints for the second common transit router may have a different value than a respective outgoing per-hop bandwidth constraint of the incoming per-hop bandwidth constraints for the second common transit router. In this example, ingress router 12A may generate, for each path of the paths, a respective resource reservation request message such that the one or more instructions further include an instruction to modify the indication of the per-hop bandwidth constraint at the second common transit router to correspond to a respective outgoing per-hop bandwidth constraint of the outgoing per-hop bandwidth constraints for the second common transit router.

FIG. 3 is a block diagram illustrating example resource reservation reply message sent by routers 12 within computer network 14 for establishing MP-LSP 16 (FIG. 1) having a varying per-hop bandwidth constraint. In the example of FIG. 3, in response to receiving resource reservation request messages 19 (FIG. 2), routers 12 may output resource reservation reply messages 21A and 21B (collectively, resource reservation reply messages 21) messages to upstream routers.

A transit router (e.g., router 12G) may perform admission control on a per sub-LSP basis. However, a transit router needs to take preventive action to mitigate following problems. Ingress router 12A may miscompute per-hop bandwidth constraints such that the associated sub-LSPs 18 (FIG. 1) violate a per-hop bandwidth constraint. For example, ingress router 12A may miscompute per-hop bandwidth constraint when sub-LSPs 18A reduces a bandwidth constraint by 30 megabytes per second and sub-LSPs 18B increases a bandwidth constraint by only 20 megabytes per second.

To mitigate the above, in some examples, a transit router (e.g., router 12G) that is capable of handling a varying per-hop bandwidth constraint may refrain from sending resource reservation reply messages 21 for a given sub-LSP until the bandwidth constraint change of each sub-LSP has been met by another sub-LSP of MP-LSP 16. To illustrate, suppose ingress router 12A has initiated signaling of sub-LSPs 18 (the count of which will not be known to a transit router T upfront), with <incoming bandwidth, outgoing bandwidth, next-hop> requirements at T represented by the following 3-tuples t1: <100, 175, B>, t2: <200, 125, C>.

Said differently, suppose ingress router 12A outputs a SENDER_TSPEC object of resource reservation request message 19A that includes a token-bucket "rate" field and a "burst" field indicating 100 megabytes per second and a SENDER_TSPEC_MODS object of resource reservation request message 19A indicates an instruction (e.g., a SENDER_TSPEC_MODS object) to modify the SENDER_TSPEC object of resource reservation request message 19A, at router 12G, to have a token-bucket "rate" field and a "burst" field indicating 175 megabytes per second. Similarly, suppose ingress router 12A outputs a SENDER_TSPEC object of resource reservation request message 19B that includes a token-bucket "rate" field and a "burst" field indicating 200 megabytes per second and a SENDER_TSPEC_MODS object of resource reservation request message 19B indicates an instruction (e.g., a SENDER_TSPEC_MODS object) to modify the SENDER_TSPEC object of resource reservation request message 19B, at router 12G, to have a token-bucket "rate" field and a "burst" field indicating 125 megabytes per second.

Because sub-LSPs 18 are separate individual sub-LSPs of MP-LSP 16, resource reservation request messages 19 for sub-LSPs 18 may be sent individually. For example, resource reservation request message 19A for sub-LSP 18A may be sent independently from resource reservation request message 19B for sub-LSP 18B. As such, router 12G would receive the 2 "3-tuple"s listed above separately. On receipt of such a tuple in resource reservation request messages 19 (FIG. 2), router 12G may forward resource reservation request messages 19 based on assuming admission-control for the individual sub-LSPs can be met. When router 12G, receives resource reservation reply message 21A from router 12D corresponding to tuple "t1", router 12G should delay sending a resource reservation reply message 21A upstream corresponding to the tuple "t1", until router 12G has also received resource reservation reply message 21B from router 12B corresponding to tuple "t2".

In the example of FIG. 3, in response to determining that router 12B corresponds to a last downstream hop of an explicit route for sub-LSP 18A of MP-LSP 16 (FIG. 1), router 12B outputs, via link 22D, resource reservation reply message 21A to router 12D to indicate an acknowledgment of resource reservation request message 19A (FIG. 2). For example, in response to determining that the EXPLICIT_ROUTE object included in resource reservation request message 19A indicates a next upstream hop is to router 12D, router 12B may forward resource reservation reply message 21A to router 12D. Router 12D outputs, via link 22C, resource reservation reply message 21A to router 12G to indicate an acknowledgment of resource reservation request message 19A (FIG. 2). For example, in response to determining that the EXPLICIT_ROUTE object included in resource reservation request message 19A indicates a next upstream hop is to router 12Q router 12D may forward resource reservation reply message 21A to router 12G.

Similarly, in response to determining that router 12B corresponds to a last downstream hop of an explicit route for sub-LSP 18B of MP-LSP 16 (FIG. 1), router 12B outputs, via link 22F, resource reservation reply message 21B to router 12G to indicate an acknowledgment of resource reservation request message 19B (FIG. 2). For example, in response to determining that the EXPLICIT_ROUTE object included in resource reservation request message 19B indicates a next upstream hop is to router 12Q router 12B may forward resource reservation reply message 21B to router 12G.

Upon receipt of only one of resource reservation reply messages, router 12G may determine that not all of the expected resource reservation reply messages have been received for MP-LSP 16. In response to determining that not all of the expected resource reservation reply messages have been received for MP-LSP 16, router 12G may delay sending a resource reservation reply message 21 upstream for MP-LSP 16. For example, in response to determining that resource reservation reply message 21A has been received and that resource reservation reply message 21B has not been received, router 12G may delay sending resource reservation reply message 21A upstream for MP-LSP 16 until router 12G has also received resource reservation reply message 21B from router 12B. Similarly, in response to determining that resource reservation reply message 21A has not been received and that resource reservation reply message 21B has been received, router 12G may delay sending resource reservation reply message 21B upstream for MP-LSP 16 until router 12G has also received resource reservation reply message 21A from router 12D.

Upon receipt of both resource reservation reply message 21A from router 12D and resource reservation reply message 21B from router 12B, router 12G determines that all of the expected resource reservation reply messages have been received for MP-LSP 16, and outputs, via link 22B, resource reservation reply message 21A to router 12C to indicate an acknowledgment of resource reservation request message 19A (FIG. 2). Router 12C outputs, via link 22A, resource reservation reply message 21A to router 12A to indicate the requested amounts of bandwidth have been reserved to satisfy resource reservation request message 19A (FIG. 2). Similarly, upon receipt of resource reservation reply message 21A from router 12D and resource reservation reply message 21B from router 12B, router 12G determines that all of the expected resource reservation reply messages have been received for MP-LSP 16, and outputs, via link 22E, resource reservation reply message 21B to router 12A to indicate the requested amounts of bandwidth have been reserved to satisfy resource reservation request message 19B (FIG. 2). Upon receipt of resource reservation reply messages 21 for MP-LSP 16, ingress router 12A may forward network traffic indicating sub-LSPs 18 of MP-LSP 16.

Figure 4:
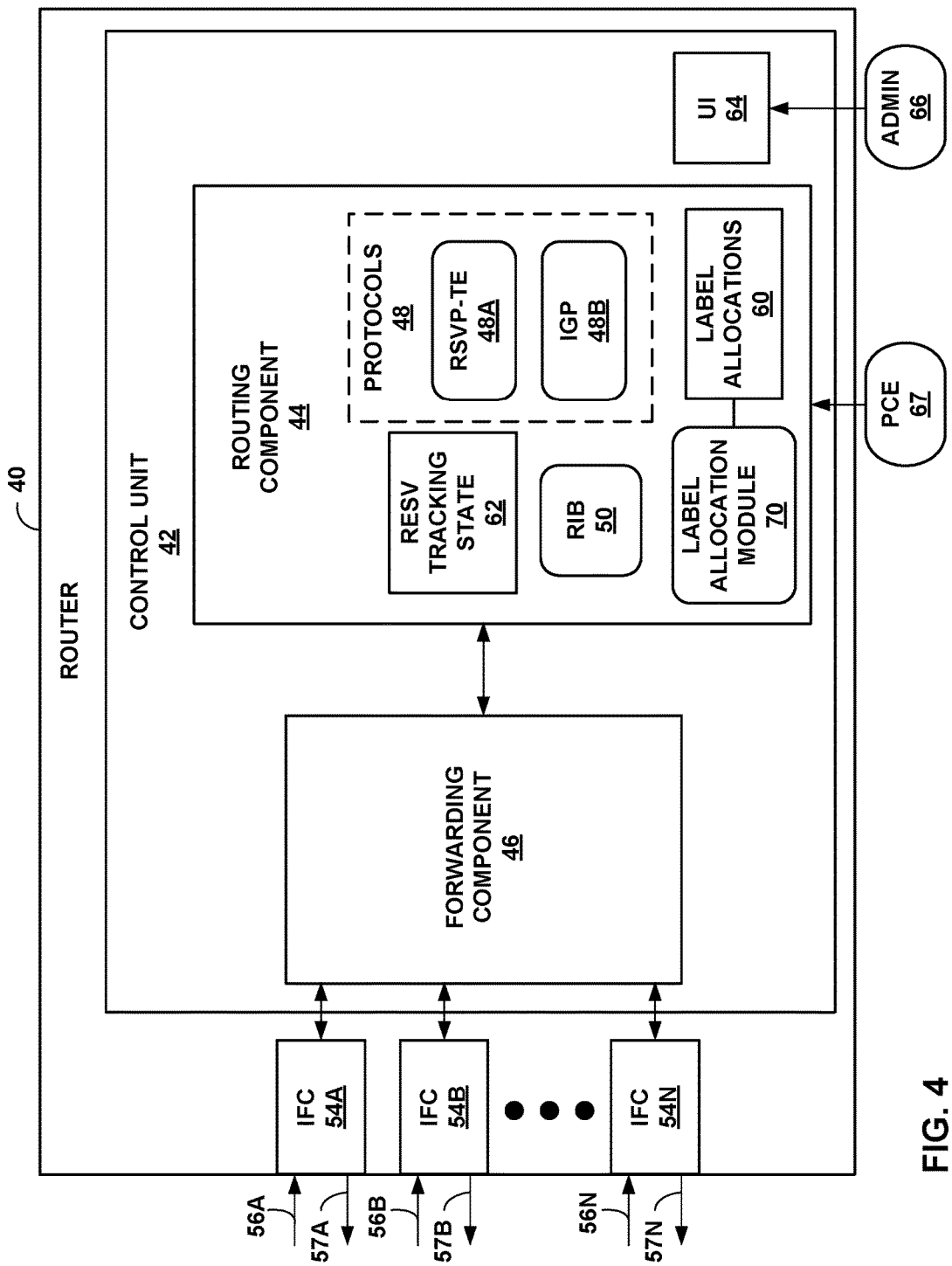
FIG. 4 is a block diagram illustrating an example router capable of supporting RSVP-TE with MP-LSP extensions in accordance with the techniques described herein.

FIG. 4 is a block diagram illustrating an example router 40 capable of supporting RSVP-TE with MP-LSP extensions in accordance with the techniques described herein. Router 40 may correspond to any of routers 12 of FIGS. 1-3. Router 40 includes interface cards 54A-54N (collectively, IFCs 54) for receiving packets via input links 56A-56N (collectively, input links 56) and sending packets via output links 57A-57N (collectively, output links 57). IFCs 54 are interconnected by a high-speed switch (not shown) and links 56, 57. In one example, router 40 comprises switch fabric, switchgear, a configurable network switch or hub, and the like. Links 56, 57 comprise any form of communication path, such as electrical paths within an integrated circuit, external data busses, optical links, network connections, wireless connections, or other type of communication path. IFCs 54 are coupled to input links 56 and output links 57 via a number of interface ports (not shown).

When router 40 receives a packet via one of input links 56, control unit 42 determines via which of output links 57 to send the packet. Control unit 42 includes routing component 44 and forwarding component 46. Routing component 44 determines one or more routes through a network, e.g., through interconnected devices such as other routers. Control unit 42 provides an operating environment for protocols 48, which are typically implemented as executable software instructions. As illustrated, protocols 48 include RSVP-TE 48A and interior gateway protocol (IGP) 48B. Examples of IGP 48B may include, but are not limited to, the Intermediate System-Intermediate System (ISIS) or the Open Shortest Path First (OSPF) protocol. Router 40 uses RSVP-TE 48A to set up LSPs. As described herein, RSVP-TE 48A is programmatically extended to allow for a varying per-hop bandwidth constraint. Protocols 48 may include other routing protocols in addition to or instead of RSVP-TE 48A and LDP 46B, such as other Multi-protocol Label Switching (MPLS) protocols; or routing protocols, such as the OSPF, routing information protocol (RIP), border gateway protocol (BGP), interior routing protocols, or other network protocols.

By executing the routing protocols, routing component 44 identifies existing routes through the network and determines new routes through the network. Routing component 44 stores routing information in a routing information base (RIB) 50 that includes, for example, known routes through the network. Forwarding component 46 stores forwarding information that includes destinations of output links 57.

In some examples, RSVP-TE 48A sends a capabilities advertisement that indicates router 40 is programmatically extended to allow for a varying per-hop bandwidth constraint. In some examples, router 40 may receive capabilities advertisements from other router and store state indicating which routers 12 (FIG. 1) are programmatically extended to allow for a varying per-hop bandwidth constraint. For example, router 40 may send or receive information about these capabilities in a TLV of a link state advertisement sent or received by OSPF or IS-IS with traffic engineering extensions.

In some examples, a system administrator 66 (also referred to as "ADMIN 66") may provide configuration information to router 40 via user interface 64 included within control unit 42. For example, the system administrator may configure router 40 or install software to extend RSVP-TE 48A as described herein. As another example, system administrator 66 may configure RSVP-TE 48A to traffic-engineer an MP-LSP from an ingress router to an egress router. As a further example, a path computation element (PCE) 67 may alternatively or additionally provide configuration information to router 40, e.g., may compute the sub-paths and provide them to router 40.

The extensions to RSVP-TE 48A described herein enable router 40 to calculate paths for multiple sub-LSPs towards an egress router of an overall RSVP-TE LSP that have a varying per-hop bandwidth constraint and to send multiple resource reservation request messages for the MP-LSP to downstream routers along selected ones of the sub-LSPs. Because the sub-LSPs are all part of the same MP-LSP, router 40 may be required to store less state versus networks that maintain separate LSPs that have a constant per-hop bandwidth constraint since the number of sub-LSPs maybe fewer due to the use of varying per-hop-bandwidth. RSVP-TE 48A may, in some examples, configure forwarding component 46 to reflect a varying per-hop bandwidth constraint for the MP-LSP.

In response to the network administrator initiating set-up of the MP-LSP, router 40 uses extended RSVP-TE 48A to compute paths for sub-LSPs of the MP-LSP to the egress router that satisfy certain constraints on the tunnel imposed by the network administrator. Constraints imposed may include, for example, bandwidth, link color, Shared Risk Link Group (SRLG), and the like. For example, the network administrator may wish to configure a MP-LSP that can handle 100 megabytes per second of network traffic. RSVP-TE 48A uses constraint information about links within network 14, such as bandwidth availability, to compute the sub-LSPs. For example, RSVP-TE 48A may use bandwidth availability information accumulated by a link-state interior routing protocol, such as the Intermediate System-Intermediate System (ISIS) protocol or the Open Shortest Path First (OSPF) protocol, e.g., ISIS or OSPF with traffic-engineering extensions. For example, RSVP-TE 48 may use a constrained shortest path first (CSPF) algorithm to compute the paths based on the link bandwidth availability. Where the network topology requires it, RSVP-TE 48A computes multiple sub-LSPs for which certain constraints, including bandwidth, provide the requisite bandwidth availability in sum. In some examples, RSVP-TE 48A takes into account the capabilities of other routers in the network when computing the paths, including the capability of processing resource reservation requests having a SENDER_TSPEC_MODS field as described herein.

RSVP-TE 48A generates and sends resource reservation request messages for establishing sub-LSPs (including MP-LSPs) as described above with reference to FIGS. 1-3. Routing component 44 may access reservation ("RESV") tracking state 62 to initiate tracking of whether all resource reservation reply message for a respective MP-LSP has been received by router 40. For example, routing component 44 may add an entry in RESV tracking state 62 associated with a MP-LSP for each sub-LSP indicated in resource reservation request messages indicating the MP-LSP.

Upon router 40 receiving a resource reservation request messages from a neighboring router, label allocation module 70 allocates MPLS labels used for establishing the LSPs. Router 40 distributes the labels and reserves bandwidth on links using RSVP-TE 48A to generate resource reservation reply messages as described above. Routing component 44 maintains label allocations 60 which specify how label allocation module 70 has allocated the MPLS labels. For example, label allocations 60 may indicate label bindings to particular forwarding equivalence classes (FECs) associated with LSPs within network 14. Label allocation module 70 may then update FIB 52 of forwarding component 46 with the labels to be applied when forwarding packets on LSPs.

RSVP-TE 48A may also be extended to recognize resource reservation request messages and resource reservation reply messages sent that contain a varying per-hop bandwidth constraint. For example, RSVP-TE 48A may be extended to recognize a received resource reservation request messages and resource reservation reply messages as one of a set of messages that collectively are used in the network to establish a MP-LSP based on an indicator (e.g., a special field or bit) set in the resource reservation request messages and resource reservation reply messages, for example. This special field or bit indicates to the receiving router that other messages received that identify the MP-LSP are not in error but instead are to be associated with one another as establishing sub-LSPs for a MP-LSP that must satisfy overall constraints, thereby allowing the receiving router to determine whether the receiving router is a merge-point or a branch-point for intermediate sub-LSPs of the MP-LSP. In some examples, RSVP-TE 48A may be extended to recognize a received resource reservation request messages and resource reservation reply messages as one of a set of messages that collectively are used in the network to establish a particular MP-LSP when each received resource reservation request message of the received resource reservation request messages includes a SESSION OBJECT that includes a particular extended tunnel identifier corresponding to the particular MP-LSP.

Upon receipt of a resource reservation reply message, routing component 44 may update an entry in RESV tracking state 62 associated with the resource reservation reply message and determine whether all resource reservation reply message for a respective MP-LSP has been received by router 40. For example, routing component 44 may update an entry in RESV tracking state 62 associated with a MP-LSP for each sub-LSP indicated in resource reservation request messages indicating the MP-LSP. In this example, routing component 44 may determine that all resource reservation reply message for a respective MP-LSP have been received by router 40 when RESV tracking state 62 indicates that a resource reservation reply message has been received for each one of the entries in RESV tracking state 62 that is associated with the MP-LSP.

Upon determining that all resource reservation reply message for a respective MP-LSP have been received by router 40 (which may be, for example, an ingress router), router 40 may initiate a new packet flow of data traffic onto the MP-LSP. For example, when router 40 receives packets of a new packet flow, forwarding component 46 identifies one of output links 57 through which to forward packets of the new packet flow, and also identifies an MPLS label to apply to the packets of the packet flow. After forwarding component 46 has selected one of output links 57 and an MPLS label for a packet flow, forwarding component 46 forwards all packets of the packet flow along the selected one of output links 57 using the selected MPLS label. Forwarding component 46 may refer to link monitoring module 68 to determine whether network traffic is appropriately allocated across output links 57 before assigning a new packet flow to the one of output links 57.

In some examples, where the packet flows are assigned to be forwarded on a sub-LSP, forwarding component 46 determines whether output links 57 are loaded with the proper bandwidth allocation, e.g., as configured by RSVP-TE 48A during establishment of the MP-LSP. In one example, forwarding component 46 determines a bandwidth utilization for each of output links 57. In another example, forwarding component 46 determines whether a number of packet flows assigned to a particular one of output links 57 has exceeded a threshold. In another example, forwarding component 46 determines a number of packets per second being sent over each of output links 57. In another example, forwarding component 46 determines a number of megabytes per second being sent over each of output links 57. In other examples, forwarding component 46 may utilize a combination of the above-described techniques, or other techniques for determining link congestion. In any case, forwarding component 46 may determine whether usage of output links 57 is consistent with the requirements specified by RSVP-TE 48A for the sub-LSPs running on the output links 57. Forwarding component 46 may also determine when one of the links fails. Forwarding component 46 updates a hash map such that traffic is diverted from the failed link onto other remaining links.

RSVP-TE 48A outputs resource reservation request messages and resource reservation reply messages for a varying per-hop bandwidth constraint. For example, RSVP-TE 48A outputs resource reservation request message that include an indication of an explicit route for a respective sub-LSP, a tunnel identifier indicating the MP-LSP, an indication of a per-hop bandwidth constraint, and an one or more instructions to modify the indication of the per-hop bandwidth constraint. In some examples, RSVP-TE 48A outputs resource reservation request message that may include further information, such as, but not limited to, objects, descriptors, or other information. In some examples, RSVP-TE 48A outputs resource reservation request message that may omit information, such as, but not limited to, an one or more instructions to modify the indication of the per-hop bandwidth constraint.

The architecture of router 40 illustrated in FIG. 4 is shown for exemplary purposes only. The techniques of this disclosure are not limited to this architecture. In other examples, router 40 may be configured differently. In one example, for example, some of the functionally of control unit 42 may be distributed within IFCs 54. In some examples, control unit 42 may include a routing engine that performs routing functions and maintains routing information base (RIB) 50, and a forwarding engine that performs packet forwarding based on a forwarding information base (FIB), generated in accordance with the RIB 50.

Control unit 42 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 42 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Figure 5:
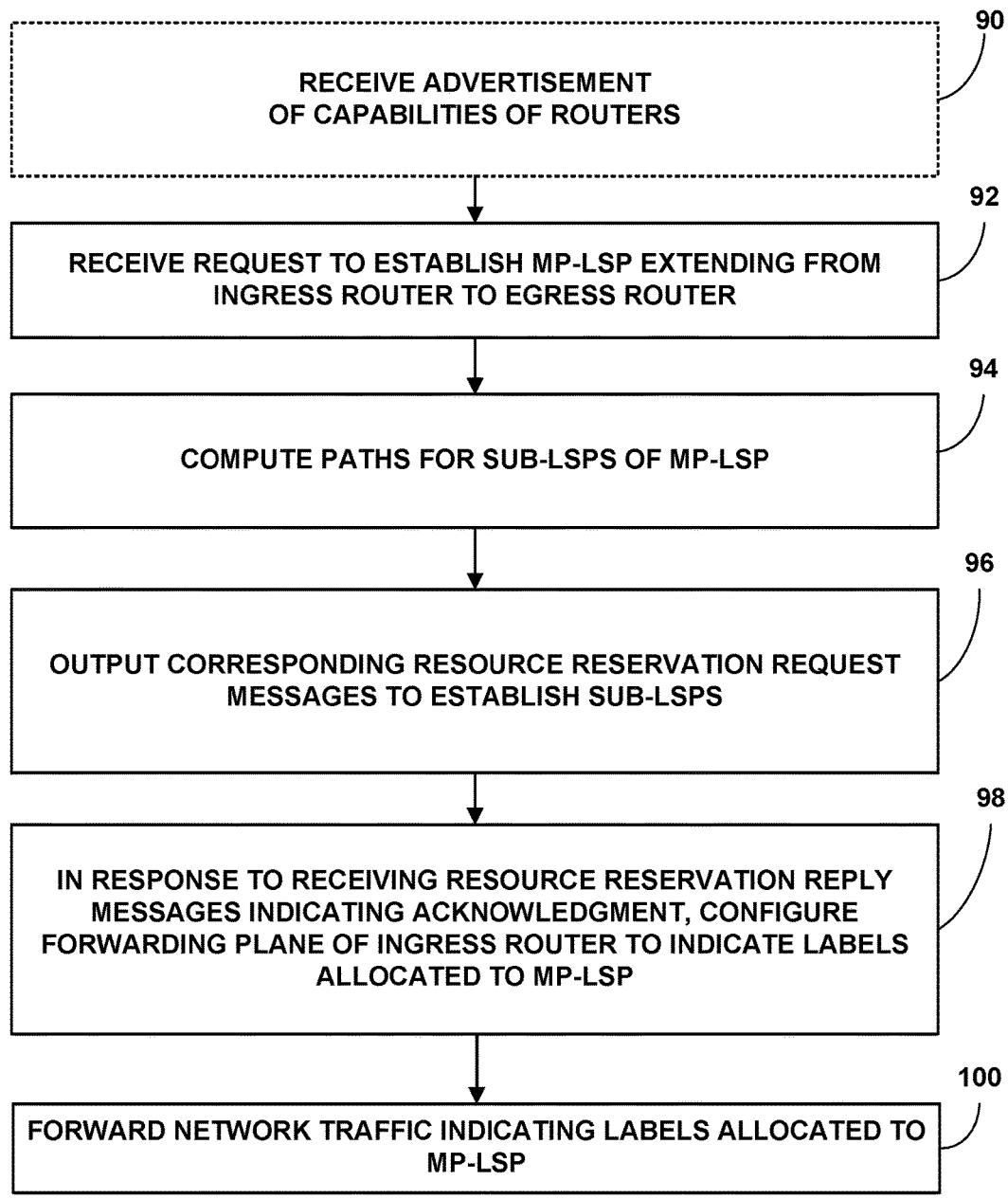
FIG. 5 is a flowchart illustrating example operation of an ingress router in establishing a MP-LSP having a varying per-hop bandwidth constraint.

FIG. 5 is a flowchart illustrating example operation of an ingress router in establishing a MP-LSP having a varying per-hop bandwidth constraint. For purposes of example, FIG. 5 will be explained with reference to routers 12 of FIG. 1 and router 40 of FIG. 4. Router 12A may receive an advertisement of capabilities of routers 12 (90). For example, ingress router 12 A may receive an indication that router 12G is configured with extensions to RSVP-TE that enable it to process RSVP-TE PATH messages that specify varying per-hop bandwidth constraints. Although not shown, router 12 may store the received capabilities information for later use in computing paths.

Router 12A may receive a request to traffic-engineer an overall RSVP-TE LSP (e.g., MP-LSP of FIG. 1) that satisfies certain constraints. For example, ingress router 12A may receive a request to establish a MP-LSP extending from ingress router 12A to an egress router 12B (92). Constraints imposed may include, for example, bandwidth, link color, Shared Risk Link Group (SRLG), and the like. For example, the network administrator may wish to configure an MP-LSP that can handle 100 megabytes per second of network traffic. RSVP-TE 48A uses constraint information about links 22 within network 14, such as bandwidth availability, to compute the sub-LSPs that satisfy the overall constraints for the MP-LSP. For example, RSVP-TE 48A may use bandwidth availability information accumulated by IGP 48B. RSVP-TE 48A computes sub-LSPs 18 for which certain constraints, including bandwidth, provide the requisite bandwidth availability in sum. RSVP-TE 48A may be configured with an upper limit on how many sub-LSPs can be computed and/or selected.

RSVP-TE 48A may compute paths for sub-LSPs of a MP-LSP (94). For example, to compute the paths, RSVP-TE 48A may determine, for sub-LSP 18A, an incoming per-hop bandwidth constraint at transit router 12G of 50 megabytes per second and an outgoing per-hop bandwidth constraint at transit router 12G of 30 megabytes per second. In this example, RSVP-TE 48A may compute, for sub-LSP 18B, a path such that an incoming per-hop bandwidth constraint at transit router 12G is 50 megabytes per second and an outgoing per-hop bandwidth constraint at transit router 12G of 70 megabytes per second.

For each one of sub-LSPs 18, RSVP-TE 48A outputs a corresponding plurality of resource reservation request messages to establish sub-LSPs (96). For example, RSVP-TE 48A generates and sends, for sub-LSP 18A, resource reservation request message 19A that indicates an explicit route of sub-LSP 18A, a tunnel identifier indicating MP-LSP, and an indication of a per-hop bandwidth constraint. For instance, RSVP-TE 48A generates and sends, for sub-LSP 18A, resource reservation request message 19A that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second.

In this example, RSVP-TE 48A generates and sends, for sub-LSP 18B, resource reservation request message 19B that indicates an explicit route of sub-LSP 18B, a tunnel identifier indicating the MP-LSP, and an indication of a per-hop bandwidth constraint. For instance, RSVP-TE 48A generates and sends, for sub-LSP 18B, resource reservation request message 19B that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second.

Moreover, in this example, resource reservation request messages 19A for sub-LSP 18A further includes an instruction to modify the indication of the per-hop bandwidth constraint at router 12G from 50 megabytes per second to 30 megabytes per second and resource reservation request message 19B for sub-LSP 18B further includes an instruction to modify the indication of the per-hop bandwidth constraint at router 12G from 50 megabytes per second to 70 megabytes per second. For instance, RSVP-TE 48A generates and sends, for sub-LSP 18A, resource reservation request message 19A that further includes a SENDER_TSPEC_MODS object that includes an address (e.g., IPV4, IPV6, etc.) of router 12G and a corresponding bandwidth mod value that includes a token-bucket "rate" field and a "burst" field indicating 30 megabytes per second. In this instance, RSVP-TE 48A generates and sends, for sub-LSP 18B, resource reservation request message 19B that further includes a SENDER_TSPEC_MODS object that includes an address (e.g., IPV4, IPV6, etc.) of router 12G and a corresponding bandwidth mod value that includes a token-bucket "rate" field and a "burst" field indicating 70 megabytes per second.

Upon receiving resource reservation request message 19A for sub-LSP 18A, router 12B forwards resource reservation reply message 21A to router 12D, which forwards resource reservation reply message 21A to router 12G Similarly, upon receiving resource reservation request message 19B for sub-LSP 18A, router 12B forwards resource reservation reply message 21B to router 12G Upon receiving resource reservation reply messages 21, router 12G forwards resource reservation reply message 21A to router 12C, which forwards resource reservation reply message 21A to router 12A, and forwards resource reservation reply message 21B to router 12A.

In response to receiving resource reservation reply messages indicating an acknowledgment, RSVP-TE 48A configures forwarding component 46 of ingress router 12A to indicate labels allocated to the MP-LSP (98). For example, in response to receiving resource reservation reply messages 21 (FIG. 3) indicating an acknowledgment, RSVP-TE 48A configures forwarding component 46 of ingress router 12A to indicate labels allocated to MP-LSP 16 to be used for forwarding network traffic to corresponding next hops along sub-LSPs 18 of MP-LSP 16. Once configured, ingress router 12A may forward network traffic using the MP-LSP (100). For example, RSVP-TE 48A forwards network traffic indicating the labels allocated to the MP-LSP.

Figure 6:
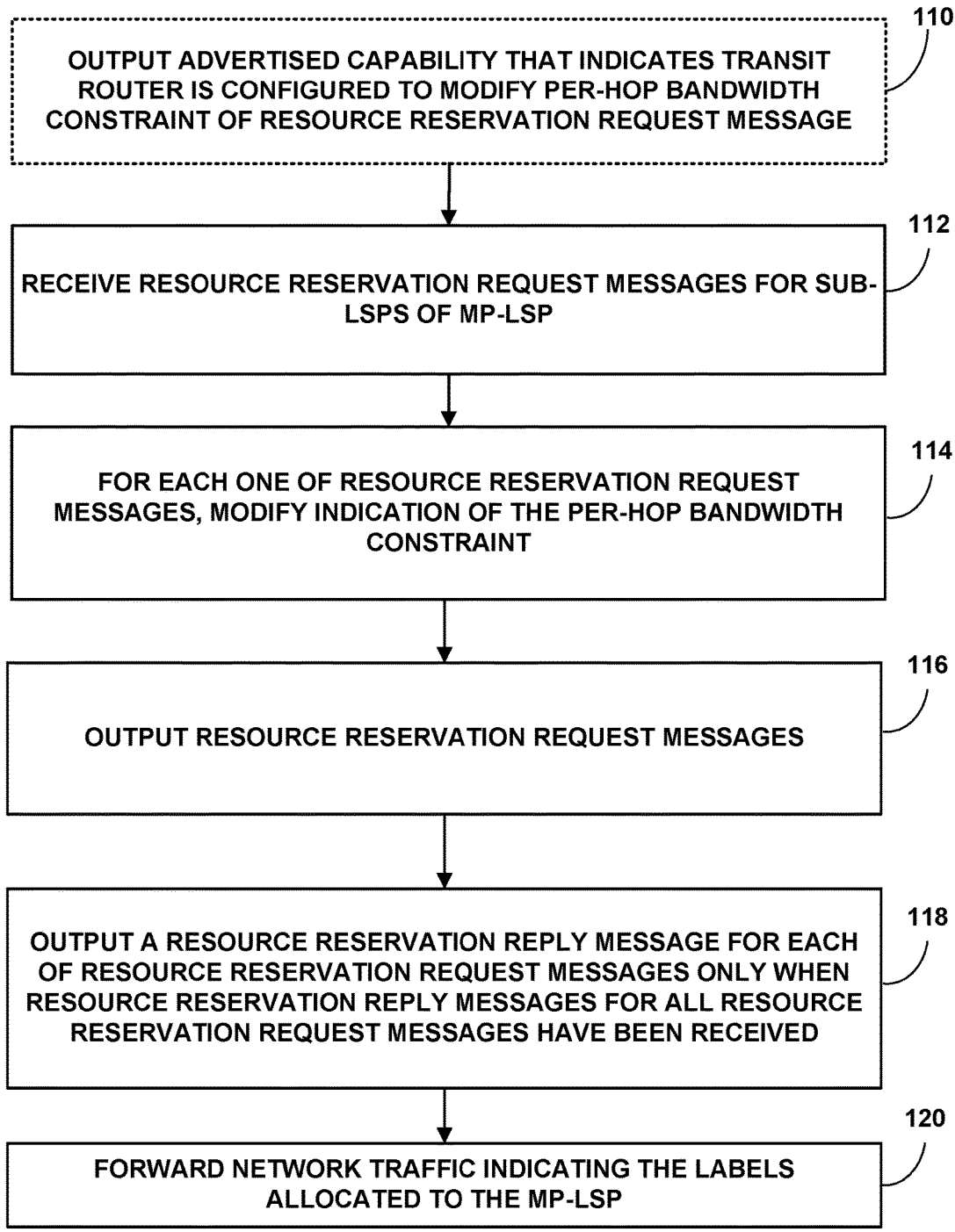
FIG. 6 is a flowchart illustrating example operation of a transit router in establishing a MP-LSP having a varying per-hop bandwidth constraint.

FIG. 6 is a flowchart illustrating example operations of a transit router 12G for establishing a MP-LSP having a varying per-hop bandwidth constraint. For purposes of example, FIG. 6 will be explained with reference to routers 12 of FIG. 1 and router 40 of FIG. 4. Transit router 12G may optionally output advertised capability information that indicates whether router 12G is configured to modify a per-hop bandwidth constraint of a resource reservation request message (110). For example, transit router 12G may output, to router 12A, advertised capability information that indicates transit router 12G is configured to modify the indication of the per-hop bandwidth constraint. In such examples, ingress router 12A may generate resource reservation request messages that account for the advertised capabilities of transit router 12G For instance, in response to transit router 12G advertised capabilities for variable bandwidth, ingress router 12A may generate a resource reservation request message that modifies a bandwidth of a sub-LSP at transit router 12G as discussed below.

Transit router 12G receives resource reservation request messages 19 for sub-LSPs 18 of MP-LSP 16 (112). For example, transit router 12G receives resource reservation request messages 19 that each indicates a reservation of 50 megabytes per second of bandwidth. For instance, transit router 12G receives, for sub-LSP 18A, resource reservation request message 19A that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second. In this instance, for instance, transit router 12G receives, for sub-LSP 18B, resource reservation request message 19B that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 50 megabytes per second.

However, resource reservation request message 19A may further include an instruction to modify the indication of the per-hop bandwidth constraint from 50 megabytes per second to 30 megabytes per second at transit router 12G and resource reservation request message 19B further includes an instruction to modify the indication of the per-hop bandwidth constraint from 50 megabytes per second to 70 megabytes per second at router 12G For instance, transit router 12G receives, for sub-LSP 18A, resource reservation request message 19A that further includes a SENDER_TSPEC_MODS object that includes an address (e.g., IPV4, IPV6, etc.) of transit router 12G and a corresponding bandwidth mod value that includes a token-bucket "rate" field and a "burst" field indicating 30 megabytes per second. In this instance, transit router 12G receives, for sub-LSP 18B, resource reservation request message 19B that further includes a SENDER_TSPEC_MODS object that includes an address (e.g., IPV4, IPV6, etc.) of router 12G and a corresponding bandwidth mod value that includes a token-bucket "rate" field and a "burst" field indicating 70 megabytes per second.

Although not shown, upon receiving resource reservation request messages 19, transit router 12G may reserve the amount of bandwidth requested in the received resource reservation request messages 19. For example, transit router 12G may reserve 50 megabytes per second for sub-LSP 18A when a SENDER_TSPEC object of resource reservation request message 19A includes a token-bucket "rate" field and a "burst" field indicating 50 megabytes per second and may reserve 50 megabytes per second for sub-LSP 18B when a SENDER_TSPEC object of resource reservation request message 19B includes a token-bucket "rate" field and a "burst" field indicating 50 megabytes per second.

For each of the resource reservation request messages 19, transit router 12G modifies an indication of the per-hop bandwidth constraint of each one of the respective resource reservation request messages (114). For example, upon receiving resource reservation request message 19A, transit router 12G modifies an indication of a per-hop bandwidth constraint of resource reservation request message 19A to indicate 30 megabytes per second of bandwidth according to the instruction to modify the indication of the per-hop bandwidth constraint from 50 megabytes per second to 30 megabytes per second at transit router 12G For instance, transit router 12G modifies, for sub-LSP 18A, a SENDER_TSPEC object of resource reservation request message 19A to include a token-bucket "rate" field and a "burst" field indicating 30 megabytes per second.

Similarly, in this example, upon receiving resource reservation request message 19B, transit router 12G modifies an indication of a per-hop bandwidth constraint of resource reservation request message 19B to indicate 70 megabytes per second of bandwidth according to the instruction to modify the indication of the per-hop bandwidth constraint of from 50 megabytes per second to 70 megabytes per second at router 12G For instance, transit router 12G modifies, for sub-LSP 18B, a SENDER_TSPEC object of resource reservation request message 19B to include a token-bucket "rate" field and a "burst" field indicating 70 megabytes per second.

Upon modifying the indications of per-hop bandwidth constraints of resource reservation request messages 19, transit router 12G outputs the resource reservation request messages (116). For example, transit router 12G forwards the resource reservation request message 19A to router 12D and forwards the resource reservation request message 19B to router 12B. For instance, transit router 12G sends, to router 12D, for sub-LSP 18A, resource reservation request message 19A that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 30 megabytes per second. In this instance, transit router 12G sends, to router 12B, for sub-LSP 18B, resource reservation request message 19B that includes an EXPLICIT_ROUTE object, SESSION_ATTRIBUTE object that includes an extended tunnel ID for MP-LSP 16, and a SENDER_TSPEC object that includes a token-bucket "rate" field and a "burst" field indicating 70 megabytes per second.

Transit router 12G outputs a resource reservation reply message 21 for each of resource reservation request messages 19 received by transit router 12G only when the transit router has received all of the corresponding resource reservation reply messages 19 (118). For example, when transit router 12G receives resource reservation reply message 21A from router 12D, transit router 12G may delay sending a resource reservation reply message 21A upstream, until transit router 12G has also received resource reservation reply message 21B from router 12B. Once configured, transit router 12G may forward network traffic indicating the labels allocated to the MP-LSP 16 (120).

Figure 7:
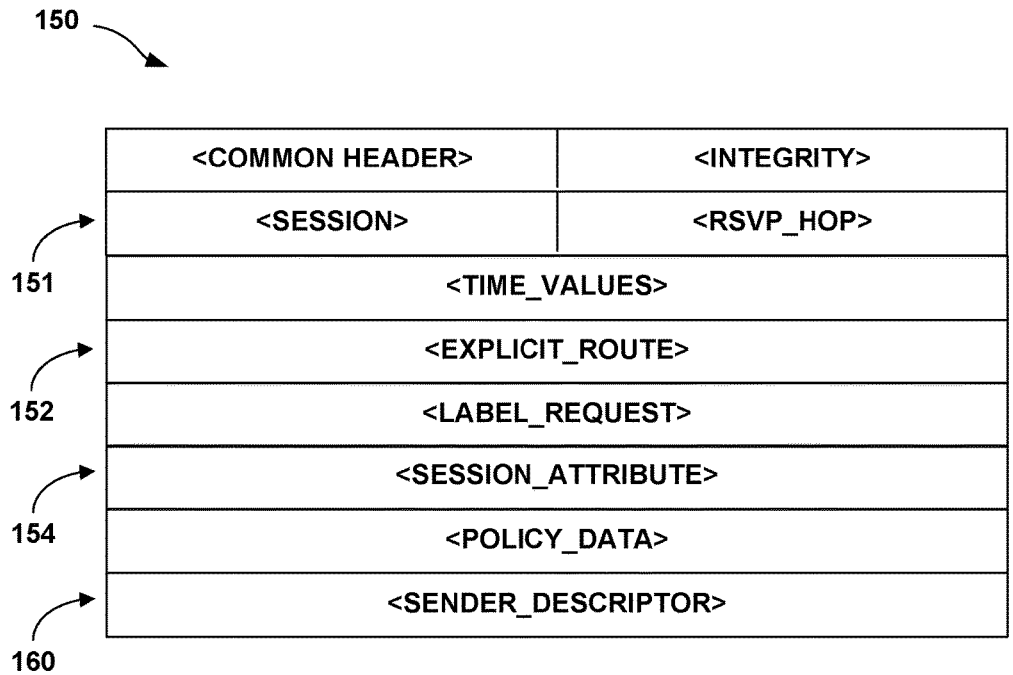
FIG. 7 is a block diagram illustrating an example resource reservation request message that signals a varying per-hop bandwidth constraint.

FIG. 7 is a block diagram illustrating an example resource reservation request message 150 that signals a varying per-hop bandwidth constraint. For example, ingress router 12A (FIG. 1) may generate resource reservation request message 150. For instance, resource reservation request messages 150 may be an example of each one of resource reservation request messages 19. In some examples, RSVP-TE 48A (FIG. 4) may generate resource reservation request message 150.

As shown in FIG. 7, resource reservation request message 150 may be formatted per RFC 3209, "RSVP-TE: Extensions to RSVP for LSP Tunnels," IETF, December 2001, hereby incorporated by reference, and referred to herein as "RFC 3209. For example, resource reservation request message 150 may be a RSVP-TE path message as defined by RFC 3209. For instance, resource reservation request message 150 may include information defined in RFC 3209, such as, but not limited to, a common header, integrity object, session object 151, RSVP hop object, time values, explicit route object 152, label request object, session attribute object 154, policy data object, and sender descriptor 160.

Session object 151 may include a tunnel identifier indicating the MP-LSP for resource reservation request message 150. For example, ingress router 12A (FIG. 1) may generate session object 151 to include a tunnel identifier assigned to MP-LSP 16 (FIG. 1). In some examples, ingress router 12A (FIG. 1) may generate session object 151 to include an extended tunnel identifier that includes an internet protocol address assigned to ingress router 12A. Routers 12 may be configured to extract a tunnel identifier indicating the MP-LSP from resource reservation request message 150.

Session object 151 may include an identifier for the respective sub-LSP for resource reservation request message 150. For example, ingress router 12A (FIG. 1) may generate session object 151 to include a tunnel identifier that includes an identifier for the respective sub-LSP. In some examples, ingress router 12A (FIG. 1) may generate session object 151 to include an extended tunnel identifier that includes an identifier for the respective sub-LSP. Routers 12 may be configured to extract an identifier for the respective sub-LSP from resource reservation request message 150.

Explicit route object 152 may indicate an explicit route for a respective sub-LSP. For example, ingress router 12A (FIG. 1) may generate explicit route object 152 to indicate an internet protocol address for each hop along the explicit route for a respective sub-LSP. In some examples, routers 12 may be configured to extract explicit route object 152 from resource reservation request message 150.

FIG. 8 is a block diagram illustrating an example sender descriptor 160 of resource reservation request message 150 of FIG. 7 that signals a varying per-hop bandwidth constraint. For example, ingress router 12A (FIG. 1) may generate resource reservation request message 150 to include sender descriptor 160. In some examples, RSVP-TE 48A (FIG. 4) may generate resource reservation request message 150 to include sender descriptor 160.

As shown in FIG. 8, sender descriptor 160 may in some respects be formatted per RFC 3209. For example, resource reservation request message 150 may include information defined in RFC 3209, such as, but not limited to, a sender template, sender TSPEC object 162, advertising specification (ADSPEC) object, and record route object. In accordance with the techniques of this disclosure, sender descriptor 160 includes sender TSPEC modification object 170.

Sender TSPEC object 162 may include an indication of a per-hop bandwidth constraint. For example, ingress router 12A (FIG. 1) may generate sender descriptor 160 of resource reservation request message 150 to include sender TSPEC object 162. In some examples, routers 12 may be configured to extract sender TSPEC object 162 from sender descriptor 160 of resource reservation request message 150. Sender TSPEC object 162 may be formatted per RFC 2210, "The Use of RSVP with IETF Integrated Services, IETF, September 1997. For example, ingress router 12A (FIG. 1) may generate sender TSPEC object 162 to include a reservation protocol (RSVP) TSPEC object that indicates the per-hop bandwidth constraint. For instance, ingress router 12A (FIG. 1) may generate sender TSPEC object 162 to include a token-bucket "rate" field and a "burst" field. In some instances, routers 12 may be configured to extract a token-bucket "rate" field and a "burst" field from sender TSPEC object 162.

FIG. 9 is a block diagram illustrating an example sender TSPEC modification object 170 of sender descriptor 160 of FIG. 8 that signals a varying per-hop bandwidth constraint. Sender TSPEC modification object 170 may include one or more instructions to modify the indication of the per-hop bandwidth constraint. For instance, sender TSPEC modification object 170 may include one or more instructions to modify a token-bucket "rate" field and/or a "burst" field of sender TSPEC object 162. As shown, sender TSPEC modification object 170 may include an indication of a number of bandwidth modifications 172, one or more indications of a hop for a bandwidth modification 174A-174N (collectively, hop indications 174), and one or more indications of a bandwidth modification 176A-176N (collectively, bandwidth indications 176).

Number of bandwidth modifications 172 may indicate the number of times (N) that sender TSPEC object 162 (FIG. 8) is to be modified while resource reservation request message 150 (FIG. 7) is being sent from an ingress router towards an egress router. The number of times (N) may generally be less than a number of hops indicated in explicit route object 152 (FIG. 7). For example, rather than generate sender TSPEC modification object 170 to indicate a bandwidth at each hop, ingress router 12A (FIG. 1) may generate number of bandwidth modifications 172 to only indicate one or more hops where a change in bandwidth occurs. For instance, ingress router 12A (FIG. 1) may generate sender TSPEC modification object 170 to include number of bandwidth modifications 172. In some instances, routers 12 may be configured to extract number of bandwidth modifications 172 from sender TSPEC modification object 170.

Hop indications 174 may define a hop along the explicit route for the respective sub-LSP to modify the indication of the per-hop bandwidth constraint. For example, hop indications 174 may specify internet protocol address assigned to a transit router. For instance, to generate an instruction to modify the indication of the per-hop bandwidth constraint at a hop at transit router 12G (FIG. 1), ingress router 12A (FIG. 1) may generate hop indication 174A to include an internet protocol address assigned to transit router 12G. As used herein, an internet protocol address may refer to an IPv4 address, IPv6 address, or another internet protocol address. In some instances, routers 12 may be configured to extract an internet protocol address of hop indications 174 from sender TSPEC modification object 170.

Bandwidth indications 176 may define a modified bandwidth at a hop along the explicit route for the respective sub-LSP to modify the indication of the per-hop bandwidth constraint. For example, bandwidth indications 176 may specify a token-bucket "rate" field and a "burst" field for sender TSPEC object 162 (FIG. 8). For instance, to generate an instruction to modify the indication of the per-hop bandwidth constraint at a hop at transit router 12G (FIG. 1), ingress router 12A (FIG. 1) may generate bandwidth indication 176A to include a token-bucket "rate" field and a "burst" field. In some instances, routers 12 may be configured to extract a token-bucket "rate" field and a "burst" field of bandwidth indications 176 from sender TSPEC modification object 170.

As shown, sender TSPEC modification object 170 may indicate two or more modifications of bandwidth at respective hops along the explicit route for the respective sub-LSP. For example, hop indications 174A-174N may define two or more hops along the explicit route for the respective sub-LSP to modify the indication of the per-hop bandwidth constraint while bandwidth indications 176A-176N may define a corresponding modification to bandwidth. In this manner, hop indications 174 and bandwidth indications 176 may form an instruction to modify sender TSPEC object 162 (FIG. 8) at two or more hops along an explicit route for a respective sub-LSP.

In some examples, sender TSPEC modification object 170 may appear in resource reservation request message 150 (FIG. 7) only if resource reservation request message 150 (FIG. 7) includes explicit route object 152 (FIG. 7) and if all hops in explicit route object 152 are specified as strict hops. Sender TSPEC modification object 170 is an optional object which the ingress router may include only when configuring network 14 (FIG. 1) for a varying per-hop bandwidth constraint. The class-num for sender TSPEC modification object 170 may be of the form of "11bbbbbb" to indicate that nodes that are not capable of processing sender TSPEC modification object 170 should forward sender TSPEC modification object 170 unmodified.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
computing, by an ingress router, a plurality of paths for a plurality of sub-label-switched paths (sub-LSPs) of a multi-path label-switched path (MP-LSP), wherein computing the plurality of paths comprises determining, for a common transit router, a plurality of incoming per-hop bandwidth constraints for the plurality of paths and a plurality of outgoing per-hop bandwidth constraints for the plurality of paths, wherein a sum of a quantity of bandwidth to be reserved by the plurality of incoming per-hop bandwidth constraints corresponds to a sum of a quantity of bandwidth to be reserved by the plurality of outgoing per-hop bandwidth constraints, and wherein, for each path of the plurality of paths, a respective incoming per-hop bandwidth constraint of the plurality of incoming per-hop bandwidth constraints has a different value than a respective outgoing per-hop bandwidth constraint of the plurality of outgoing per-hop bandwidth constraints; and
outputting, by the ingress router, for each path of the plurality of paths, a respective resource reservation request message to establish a respective sub-LSP of the plurality of sub-LSPs, each respective resource reservation request message including an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint, the one or more instructions including an instruction to modify the indication of the per-hop bandwidth constraint at the common transit router to correspond to a respective outgoing per-hop bandwidth constraint of the plurality of outgoing per-hop bandwidth constraints.

2. The method of claim 1, further comprising:
in response to receiving, by the ingress router, for each sub-LSP of the MP-LSP, a resource reservation reply message indicating an acknowledgment by a plurality of transit routers arranged at a respective sub-LSP of the MP-LSP and the egress router, forwarding, by the ingress router, network traffic indicating the MP-LSP.

3. The method of claim 1, further comprising:
receiving, by the ingress router, advertised capability information for the common transit router indicating that the common transit router is configured to modify, for each path of the plurality of paths, the indication of the per-hop bandwidth constraint,
wherein computing the plurality of paths is based on the advertised capability information.

4. The method of claim 1, wherein the one or more instructions are a plurality of instructions, each instruction of the plurality of instructions indicating a modification of the indication of the per-hop bandwidth constraint by a respective common transit router of a plurality of common transit routers, the method further comprising:
generating, by the ingress router, for each path of the plurality of paths, the respective resource reservation request message such that the one or more instructions include an indication of a number of times that the indication of the per-hop bandwidth constraint is to be modified by the plurality of instructions.

5. The method of claim 1, further comprising:
generating, by the ingress router, for each path of the plurality of paths, the respective resource reservation request message such that the one or more instructions indicate a hop that corresponds to the common transit router using an internet protocol address assigned to the common transit router.

6. The method of claim 1, further comprising:
generating, by the ingress router, for each path of the plurality of paths, the respective resource reservation request message to comprise a resource reservation protocol traffic engineering (RSVP-TE) path message.

7. The method of claim 1, further comprising:
generating, by the ingress router, for each path of the plurality of paths, the respective resource reservation request message to include a reservation protocol (RSVP) sender traffic specifier (TSPEC) object that includes the indication of the per-hop bandwidth constraint.

8. The method of claim 1, further comprising:
generating, by the ingress router, for each path of the plurality of paths, the respective resource reservation request message such that the indication of the per-hop bandwidth constraint indicates a single token bucket rate for the respective sub-LSP and a single peak data rate for the respective sub-LSP.

9. The method of claim 1, wherein:
the common transit router is a first common transit router; and computing the plurality of paths further comprises determining, for a second common transit router, a plurality of incoming per-hop bandwidth constraints for the plurality of paths and a plurality of outgoing per-hop bandwidth constraints for the plurality of paths, wherein a sum of a quantity of bandwidth to be reserved by the plurality of incoming per-hop bandwidth constraints for the second common transit router corresponds to a sum of a quantity of bandwidth to be reserved by the plurality of outgoing per-hop bandwidth constraints for the second common transit router, and wherein, for each path of the plurality of paths, a respective incoming per-hop bandwidth constraint of the plurality of incoming per-hop bandwidth constraints for the second common transit router has a different value than a respective outgoing per-hop bandwidth constraint of the plurality of incoming per-hop bandwidth constraints for the second common transit router, the method further comprising:

generating, by the ingress router, for each path of the plurality of paths, the respective resource reservation request message such that the one or more instructions further include an instruction to modify the indication of the per-hop bandwidth constraint at the second common transit router to correspond to a respective outgoing per-hop bandwidth constraint of the plurality of outgoing per-hop bandwidth constraints for the second common transit router.

10. A router comprising one or more processors implemented in circuitry, the one or more processors being configured to:

compute a plurality of paths for a plurality of sub-label-switched paths (sub-LSPs) of a multi-path label-switched path (MP-LSP), wherein computing the plurality of paths comprises determining, for a common transit router, a plurality of incoming per-hop bandwidth constraints for the plurality of paths and a plurality of outgoing per-hop bandwidth constraints for the plurality of paths, wherein a sum of a quantity of bandwidth to be reserved by the plurality of incoming per-hop bandwidth constraints corresponds to a sum of a quantity of bandwidth to be reserved by the plurality of outgoing per-hop bandwidth constraints, and wherein, for each path of the plurality of paths, a respective incoming per-hop bandwidth constraint of the plurality of incoming per-hop bandwidth constraints has a different value than a respective outgoing per-hop bandwidth constraint of the plurality of outgoing per-hop bandwidth constraints; and output, for each path of the plurality of paths, a respective resource reservation request message to establish a respective sub-LSP of the plurality of sub-LSPs, each respective resource reservation request message including an indication of an explicit route, a tunnel identifier indicating the MP-LSP, an identifier for the respective sub-LSP, an indication of a per-hop bandwidth constraint that corresponds to a respective incoming per-hop bandwidth constraint of the plurality of incoming per-hop bandwidth constraints, and one or more instructions to modify the indication of the per-hop bandwidth constraint, the one or more instructions including an instruction to modify the indication of the per-hop bandwidth constraint at the common transit router to correspond to a respective outgoing per-hop bandwidth constraint of the plurality of outgoing per-hop bandwidth constraints.

11. The router of claim 10, wherein the one or more processors are further configured to:
in response to receiving, by the ingress router, for each sub-LSP of the MP-LSP, a resource reservation reply message indicating an acknowledgment by a plurality of transit routers arranged at a respective sub-LSP of the MP-LSP and the egress router, forward network traffic indicating the MP-LSP.

12. The router of claim 10, wherein the one or more processors are further configured to:
receive advertised capability information for the common transit router indicating that the common transit router is configured to modify, for each path of the plurality of paths, the indication of the per-hop bandwidth constraint,
wherein, to compute the plurality of paths, the one or more processors are configured to compute the plurality of paths based on the advertised capability information.

13. The router of claim 10, wherein the one or more instructions are a plurality of instructions, each instruction of the plurality of instructions indicating a modification of the indication of the per-hop bandwidth constraint by a respective common transit router of a plurality of common transit routers and wherein the one or more processors are further configured to:
generate, for each path of the plurality of paths, the respective resource reservation request message such that the one or more instructions include an indication of a number of times that the indication of the per-hop bandwidth constraint is to be modified by the plurality of instructions.

14. The router of claim 10, wherein the one or more processors are further configured to:
generate, for each path of the plurality of paths, the respective resource reservation request message such that the one or more instructions indicate a hop that corresponds to the common transit router using an internet protocol address assigned to the common transit router.

15. The router of claim 10, wherein the one or more processors are further configured to:
generate, for each path of the plurality of paths, the respective resource reservation request message to comprise a resource reservation protocol traffic engineering (RSVP-TE) path message; and
generate, for each path of the plurality of paths, the respective resource reservation request message to include a reservation protocol (RSVP) sender traffic specifier (TSPEC) object that includes the indication of the per-hop bandwidth constraint.

16. A method comprising:
receiving, by a transit router, for a sub-label-switched path (sub-LSP) of a multi-path label-switched path (MP-LSP), a resource reservation request message to establish the sub-LSP, the resource reservation request message including an indication of an explicit route, a tunnel identifier indicating the MP-LSP, an indication of a per-hop bandwidth constraint that corresponds to a first per-hop bandwidth constraint, and one or more instructions to modify the indication of the per-hop bandwidth constraint, the one or more instructions including an instruction to modify the indication of the per-hop bandwidth constraint at the transit router to correspond to a second per-hop bandwidth constraint that has a different value than the first per-hop bandwidth constraint;

modifying, by the transit router, the indication of the per-hop bandwidth constraint to correspond to the second per-hop bandwidth constraint; and outputting, by the transit router, after modifying the indication of the per-hop bandwidth constraint, the resource reservation request message.

17. The method of claim 16, wherein receiving the resource reservation request message comprises receiving a plurality of resource reservation request messages for a plurality of sub-LSPs of the MP-LSP, the method further comprising:

outputting, by the transit router, a resource reservation reply message for each of the plurality of resource reservation request messages received by the transit router only when the transit router has received a corresponding plurality of resource reservation reply messages that acknowledge resource reservations for all of the plurality of resource reservation request messages output by the transit router.

18. The method of claim 16, further comprising:

extracting, by the transit router, the first per-hop bandwidth constraint from the indication of the per-hop bandwidth constraint; and allocating, by the transit router, for the sub-LSP, one or more resources of the transit router to satisfy the first per-hop bandwidth constraint extracted from the indication of the per-hop bandwidth constraint.

19. The method of claim 16, further comprising:

outputting, by the transit router, to an ingress router for the MP-LSP, advertised capability information for the transit router prior to receiving the resource reservation request message.

20. The method of claim 16, further comprising:

extracting, by the transit router, from the one or more instructions, an indication of a number of times that the indication of the per-hop bandwidth constraint is to be modified by the one or more instructions.

21. The method of claim 16, further comprising:

extracting, by the transit router, an internet protocol address assigned to the transit router from the instruction to modify the indication of the per-hop bandwidth constraint at the transit router.

22. The method of claim 16, wherein the resource reservation request message comprises a resource reservation protocol traffic engineering (RSVP-TE) path message.

23. The method of claim 16, wherein the resource reservation request message comprises a reservation protocol (RSVP) sender traffic specifier (TSPEC) object that includes the indication of the per-hop bandwidth constraint.

24. The method of claim 16, wherein the indication of the per-hop bandwidth constraint indicates a single token bucket rate for the sub-LSP and a single peak data rate for the sub-LSP.

25. A router comprising one or more processors implemented in circuitry, the one or more processors being configured to:

receive, for a sub-label-switched path (sub-LSP) of a multi-path label-switched path (MP-LSP), a resource reservation request message to establish the sub-LSP, the resource reservation request message including an indication of an explicit route, a tunnel identifier indicating the MP-LSP, an indication of a per-hop bandwidth constraint that corresponds to a first per-hop bandwidth constraint, and one or more instructions to modify the indication of the per-hop bandwidth constraint, the one or more instructions including an instruction to modify the indication of the per-hop bandwidth constraint at the transit router to correspond to a second per-hop bandwidth constraint that has a different value than the first per-hop bandwidth constraint;

modify the indication of the per-hop bandwidth constraint to correspond to the second per-hop bandwidth constraint; and output, after modifying the indication of the per-hop bandwidth constraint, the resource reservation request message.

26. The router of claim 25, wherein, to receive the resource reservation request message, the one or more processors are further configured to receive a plurality of resource reservation request messages for a plurality of sub-LSPs of the MP-LSP, the one or more processors being further configured to:

output a resource reservation reply message for each of the plurality of resource reservation request messages received by the transit router only when the transit router has received a corresponding plurality of resource reservation reply messages that acknowledge resource reservations for all of the plurality of resource reservation request messages output by the transit router.

27. The router of claim 25, wherein the one or more processors are further configured to:

extract the first per-hop bandwidth constraint from the indication of the per-hop bandwidth constraint; and allocate, for the sub-LSP, one or more resources of the transit router to satisfy the first per-hop bandwidth constraint extracted from the indication of the per-hop bandwidth constraint.

28. The router of claim 25, wherein the one or more processors are further configured to:

output, to an ingress router for the MP-LSP, advertised capability information for the transit router prior to receiving the resource reservation request message.

29. The router of claim 25, wherein the one or more processors are further configured to:

extract, from the one or more instructions, an indication of a number of times that the indication of the per-hop bandwidth constraint is to be modified by the one or more instructions.

30. The router of claim 25, wherein the one or more processors are further configured to:

extract an internet protocol address assigned to the transit router from the instruction to modify the indication of the per-hop bandwidth constraint at the transit router.

* * * * *